US005710565A

United States Patent [19]
Shirai et al.

[11] Patent Number: 5,710,565
[45] Date of Patent: Jan. 20, 1998

[54] SYSTEM FOR CONTROLLING DISTANCE TO A VEHICLE TRAVELING AHEAD BASED ON AN ADJUSTABLE PROBABILITY DISTRIBUTION

[75] Inventors: Noriaki Shirai, Oobu; Katsuhiko Hibino, Anjo; Takao Nishimura, Nagoya, all of Japan

[73] Assignee: Nippondenso Co., Ltd., Kariya, Japan

[21] Appl. No.: 626,140

[22] Filed: Apr. 5, 1996

[30] Foreign Application Priority Data

Apr. 6, 1995 [JP] Japan .................................. 7-081393

[51] Int. Cl.$^6$ ...................................................... G01S 13/93
[52] U.S. Cl. .................... 342/70; 342/71; 342/72; 342/456; 340/903
[58] Field of Search .................... 342/70, 71, 72, 342/114, 456, 455, 461; 340/903, 932, 435, 436, 447, 465, 466, 467

[56] References Cited

U.S. PATENT DOCUMENTS

| | | | |
|---|---|---|---|
| 3,773,136 | 11/1973 | Palazzetti et al. | 180/168 |
| 4,158,841 | 6/1979 | Wuchner et al. | 342/71 |
| 4,257,029 | 3/1981 | Stevens | 340/915 |
| 4,703,429 | 10/1987 | Sakata | 364/426 |
| 4,757,450 | 7/1988 | Etoh | 342/70 X |
| 5,223,907 | 6/1993 | Asayama | 356/1 |
| 5,396,426 | 3/1995 | Hibino et al. | 342/455 X |
| 5,400,864 | 3/1995 | Winner et al. | 180/169 |
| 5,530,420 | 6/1996 | Tsuchiya et al. | 340/435 |
| 5,612,686 | 3/1997 | Takano et al. | 340/903 |

FOREIGN PATENT DOCUMENTS

| | | |
|---|---|---|
| 0 605 104 A1 | 7/1994 | European Pat. Off. . |
| 3-47209 | 7/1991 | Japan . |
| 3-78596 | 12/1991 | Japan . |
| 4-201629 | 7/1992 | Japan . |
| 4-248489 | 9/1992 | Japan . |
| 4-262498 | 9/1992 | Japan . |
| 5-113482 | 5/1993 | Japan . |
| 5-126947 | 5/1993 | Japan . |
| 6-68400 | 3/1994 | Japan . |
| 6-144076 | 5/1994 | Japan . |
| 6-150200 | 5/1994 | Japan . |
| 6-176300 | 6/1994 | Japan . |
| 6-191321 | 7/1994 | Japan . |
| 6-206469 | 7/1994 | Japan . |
| 6-215290 | 8/1994 | Japan . |
| 6-219183 | 8/1994 | Japan . |
| 7-81604 | 3/1995 | Japan . |

*Primary Examiner*—John B. Sotomayor
*Attorney, Agent, or Firm*—Cushman, Darby & Cushman IP Group of Pillsbury Madison & Sutro LLP

[57] ABSTRACT

An intervehicle distance control system for automotive vehicles is provided which includes a laser scanning type distance sensor for scanning a laser beam in a width-wise direction of a system vehicle to determine relative positions and relative angles of objects within a forward detectable zone and determines same lane probabilities that the objects exist in the same lane of a road as the system vehicle using a variable probability distribution based on the relative positions and the relative angles of the objects. A target preceding vehicle is then selected from the objects based on the same lane probabilities for controlling the speed of the system vehicle to maintain a distance to the target preceding vehicle constant.

50 Claims, 18 Drawing Sheets

FIG. 9(a) θo
FIG. 9(b) θck
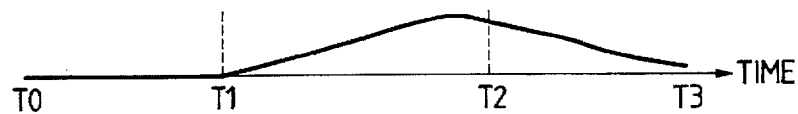
FIG. 9(c) θck(a)
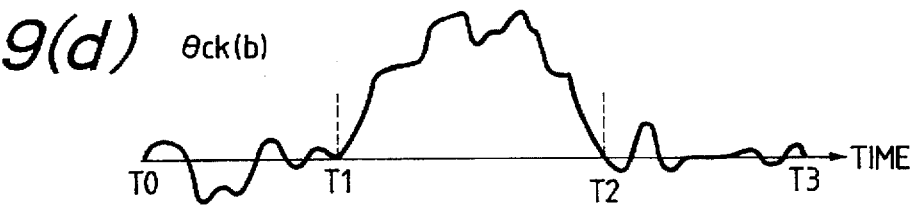
FIG. 9(d) θck(b)
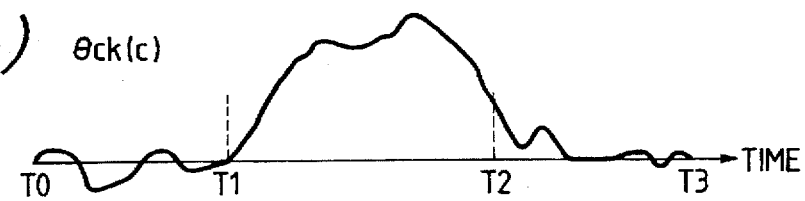
FIG. 9(e) θck(c)

CLOSER ← → AWAY

| De (m)　Vr (Km/n) | -32 | -16 | 0 | 16 | 32 | 48 | 64 |
|---|---|---|---|---|---|---|---|
| 16 | 1 | 2 | 2 | 2 | 2 | 2 | 2 |
| 8 | 2 | 2 | 2 | 2 | 2 | 2 | 2 |
| 0 | -1.5 | -1.5 | 0 | 1 | 1.5 | 2 | 2 |
| -8 | -10 | -5 | -3 | -1.5 | 0 | 0 | 0.5 |
| -16 | -10 | -10 | -10 | -5 | -5 | -3 | -0.5 |
| -24 | -10 | -10 | -10 | -10 | -10 | -3 | -1.5 |

AWAY ↑ / CLOSER ↓

UNIT: Km/h/s

SYSTEM FOR CONTROLLING DISTANCE TO A VEHICLE TRAVELING AHEAD BASED ON AN ADJUSTABLE PROBABILITY DISTRIBUTION

BACKGROUND OF THE INVENTION

1. Technical Field

The present invention relates generally to an intervehicle distance control system for automotive vehicles. More particularly, the invention relates to an intervehicle distance control system including a radar system designed to detect a preceding vehicle traveling ahead for maintaining an intervehicle distance between the preceding vehicle and a controlled system vehicle at a given value under cruise control.

2. Background Art

An automotive intervehicle distance control system is well known in the art which measures a relative speed of a preceding vehicle to a system vehicle and a distance to the preceding vehicle to hold the distance at a set value.

Such a system usually includes a preceding vehicle detector which measures the distance to a preceding vehicle. A preceding vehicle detector of this type normally includes a laser radar unit. The laser radar unit, however, has the drawback in that, if the direction of a laser beam is fixed, it becomes impossible to radiate the laser beam a long distance when a system vehicle is traveling on a curved road, thereby causing a vehicle moving on a different traffic lane as well as billboards or reflectors arranged along the road to be identified as a target vehicle traveling ahead on the same traffic lane.

For avoiding the above drawback, there has been proposed a scan type laser radar which scans a laser beam over a given zone. Additionally, there has been proposed a curve detector which determines whether an obstacle existing on a curve in the road detected by a scan type laser radar is a vehicle moving on the same traffic lane or not. For example, Japanese Patent First Publication No. 4-248489 teaches a preceding vehicle detecting system which determines whether an obstacle present ahead is a preceding vehicle or not based on the radius of a curve calculated using a steered angle. The drawback is, however, encountered in that, if there is a difference between the calculated radius and an actual radius of the curve, it will cause the preceding vehicle to be lost or another obstacle to be tracked as a target vehicle.

Further, Japanese Patent First Publication No. 6-176300 (corresponding to U.S. patent application Ser. No. 08/162,276, filed on Dec. 7, 1993, assigned to the same assignee as that of this application) teaches a unique concept that it is determined whether an object tracked by a radar is a preceding vehicle or not using a preceding vehicle probability. This prior art, however, uses a fixed beam type laser radar and has the disadvantage that the preceding vehicle probability has no information on the width-wise direction of the system vehicle. Specifically, the preceding vehicle probability is used on the assumption that data disappears when the preceding vehicle moves in the width-wise direction of the system vehicle.

SUMMARY OF THE INVENTION

It is therefore a principal object of the present invention to avoid the disadvantages of the prior art.

It is another object of the present invention to provide an intervehicle distance control system which includes a scan type radar unit detecting objects ahead of a system vehicle and selects a target preceding vehicle out of the detected objects using an adjustable same lane probability that the target preceding vehicle exists on the same lane as the system vehicle.

According to one aspect of the present invention, there is provided a system for controlling an intervehicle distance between a system vehicle equipped with the system and a preceding vehicle present ahead of the system vehicle which comprises (a) a speed measuring means for measuring a speed of the system vehicle, (b) a beam scanning means for scanning a beam over a given scanning angle in a width-wise direction of the system vehicle and receiving beams reflected from objects present within a forward detection zone defined by the scanning angle to detect the objects, (c) a distance and angular position determining means for determining distances to and angular positions of the objects in the forward detection zone based on the reflected beams, (d) a relative position and speed determining means for determining relative positions and relative speeds of the objects to the system vehicle based on the distances and the angular positions of the objects determined by the distance and angular position determining means, (e) a curve determining means for determining a degree of a curve in a road on which the system vehicle is traveling, (f) a same lane probability determining means for determining same lane probabilities of the objects being present in the same traffic lane as the system vehicle based on the degree of the curve determined by the curve determining means and the relative positions of the objects determined by the relative position and speed determining means, (g) a target preceding vehicle selecting means for selecting a target preceding vehicle out of the objects in the forward detection zone based on the same lane probabilities determined by the same lane probability determining means, and (h) an intervehicle distance control means for controlling an intervehicle distance between the system vehicle and the target preceding vehicle selected by the target preceding vehicle selecting means, the intervehicle distance means controlling the speed of the system vehicle measured by the speed measuring means to control the intervehicle distance.

In the preferred mode of the invention, the curve determining means includes (a) a steered angle detecting means for detecting a steered angle of the system vehicle at given control cycles, (b) an average steered angle determining means for determining an average steered angle at the given control cycles based on the steered angle detected by the steered angle detecting means, the average steered angle determining means updating the average steered angle based on the average steered angle determined one control cycle earlier and the steered angle detected by the steered detecting means at a current control cycle, (c) a straight travel determining means for determining whether the system vehicle is traveling straight or not based on a variation in the steered angle detected by the steered angle detecting means, (d) a neutral steered angle learning means for learning the steered angles of the system vehicle detected by the steered angle detecting means at given learning cycles when the straight travel determining means determines that the system vehicle is traveling straight to determine a neutral steered angle, and (e) a curve degree determining means for determining the degree of the curve of the road based on a deviation between the neutral steered angle determined by the neutral steered angle learning means and the average steered angle determined by the average steered angle determining means.

The average steered angle determining means carries out a weighted averaging operation on the average steered angle determined one control cycle earlier and the steered angle detected by the steered angle at a current control cycle to update the average steered angle when the speed of the system vehicle measured by the speed measuring means is greater than a given speed, while the steered angle detected at the current control cycle is defined as the average steered angle when the speed of the system vehicle is smaller than the given speed.

A steered angle stability determining means is further provided for determining whether the steered angle detected by the steered angle detecting means is stable or not. When the speed of the system vehicle measured by the speed measuring means is greater than the given speed and the steered angle stability determining means determines that the steered angle is stable, the average steered angle determining means adds in the weighted averaging operation a greater weight to the steered angle detected at the current control cycle. When the speed of the system vehicle is greater than the given speed and the steered angle stability determining means determines that the steered angle is unstable, the average steered angle determining means adds a smaller weight to the steered angle detected at the current control cycle.

A steered angle variation determining means is provided for determining whether a variation in the steered angle detected by the steered angle detecting means is greater than a given value or not. When the Speed of the system vehicle measured by the speed measuring means is greater than the given speed, the steered angle stability determining means determines that the steered angle is stable for a given period of time after the steered angle variation determining means determines that the variation in the steered angle is greater than the given value, while the steered angle stability determining means determines that the steered angle is unstable during a time out of the given period of time.

A variation check steered angle determining means is provided for determining a variation check steered angle that is a given parameter for determining the variation in the steered angle detected by the steered angle detecting means. The variation check steered angle determining means updates the variation check steered angle at the control cycles by carrying out a weighted averaging operation on the variation check steered angle one control cycle earner and the variation check steered angle at a current control cycle. The steered angle variation determining means determines that the variation in the steered angle detected by the steered angle detecting means is greater than the given value when a difference between the variation check steered angle and the steered angle detected by the steered angle detecting means is greater than a given value.

When the speed of the system vehicle measured by the speed measuring means is greater than the given speed and the steered angle stability determining means determines that the steered angle is stable, the variation check steered angle determining means adds in the weighted averaging operation a smaller weight to the steered angle detected at the current control cycle. When the speed of the system vehicle is greater than the given speed and the steered angle stability determining means determines that the steered angle is unstable, the variation check steered angle determining means adds a greater weight to the steered angle detected at the current control cycle. When the speed of the system vehicle is smaller than the given speed, the variation check steered angle determining means adds an intermediate weight between the greater weight and the smaller weight to the steered angle detected at the current control cycle.

A learning allowing means is provided for allowing the neutral steered angle learning means to learn the steered angles of the system vehicle detected by the steered angle detecting means to determine the neutral steered angle a give period of time after the steered angle variation determining means determines that the variation in the steered angle detected by the steered angle detecting means is greater than the given value when the speed of the system vehicle measured by the speed measuring means is greater than a preselected speed and the difference between the variation check steered angle determined by the variation check steered angle determining means and the steered angle detected by the steered angle detecting means is smaller than the given value.

The neutral steered angle learning means determines a neutral position learning angle to determine the neutral steered angle based on the steered angle detected by the steered angle detecting means when the straight travel determining means determines that the system vehicle is traveling straight, and updates the neutral position learning angle at the control cycles by carrying out a weighted averaging operation on the neutral position learning angle determined one control cycle earlier and the steered angle detected at a current control cycle. A weight added to the neutral position learning angle in the weighted averaging operation is increased every control cycle.

The degree to which the weight added to the neutral position learning angle is increased every control cycle is increased according to an increase in the speed of the system vehicle measured by the speed measuring means.

The curve degree determining means determines the degree of the curve of the road based on a deviation between the neutral steered angle determined by the neutral steered angle learning means and the average steered angle determined by the average steered angle determining means when a first condition where the speed of the system vehicle measured by the speed measuring means is greater than a predetermined speed and a given number of the learning cycles expire is encountered. The deviation between the neutral steered angle and the average steered angle is decreased when a second condition different from the first condition is encountered.

The same lane probability determining means includes (a) a same lane probability distribution map representing a probability that an object present ahead of the system vehicle exist in the same traffic lane on a straight road as that in which the system vehicle is traveling based on a relative position of the object to the system vehicle, (b) a relative position converting means for converting the relative positions of the objects determined by the relative position and speed determining means into relative positions of the objects to the system vehicle if the objects exit on the straight road based on the degree of the curve determined by the curve determining means, and (c) an instantaneous same lane probability determining means for determining instantaneous probabilities that the objects detected by the beam scanning means exist in the same traffic lane as the system vehicle by look-up using the same lane probability distribution map based on the relative positions convened by the relative position converting means. The same lane probability determining means determines the same lane probabilities of the objects based on the instantaneous probabilities.

The same lane probability determining means updates the same lane probabilities of the objects at the control cycles using a weighted averaging operation on the same lane probabilities determined one control cycle earlier and the Instantaneous same lane probabilities, respectively.

When the instantaneous same lane probabilities are greater than a given value, a weight added to the instantaneous same lane probabilities in the weighted averaging operation is increased.

When one of the objects detected by the beam scanning means is a stationary object, the same lane probability determining means provides a given upper limit to the same lane probability of the one of the objects.

The same lane probability distribution map indicating a lower probability distribution lowered by a given probability and a higher probability distribution higher than the given probability. The lower probability distribution spreads in a forward direction from the system vehicle and indicating a probability which is decreased in a lateral direction perpendicular to a traveling direction of the system vehicle. The higher probability distribution narrows in the forward direction and being converged at a given distance away from the system vehicle.

The lower probability distribution is defined by first and second curved boundary lines extending in the forward direction from the system vehicle.

The lower probability distribution is defined by first and second curved boundary lines spreading in the forward direction from the system vehicle in proportion to the square of a distance away from the system vehicle in the forward direction.

The higher probability distribution is defined by first and second curved lines expanding in the lateral direction.

The higher probability distribution may alternatively be defined by first and second straight lines intersecting at the given distance away from the system vehicle.

The relative position and speed determining means determines whether the objects detected by the beam scanning means are moving object or stationary objects based on the relative speeds of the objects and the speed of the system vehicle. The target preceding vehicle selecting means includes (a) a target moving preceding vehicle selecting means for selecting from among the same lane probabilities greater than a first probability the greatest one as a reference probability, selecting from among the moving objects showing the same lane probabilities within a given range over the reference probability and the moving objects showing the same lane probabilities greater than a second probability one of the smallest distance between itself and the system vehicle as a target moving preceding vehicle, and determining that there is no target moving preceding vehicle if the reference probability is not selected, (b) a target stationary preceding vehicle selecting means for selecting from among the stationary objects showing the same lane probabilities greater than a third probability one of the smallest distance between itself and the system vehicle as a target stationary preceding vehicle and determining that there is no target stationary preceding vehicle if there is no stationary objects showing the same lane probabilities greater than the third probability, and (c) a target preceding vehicle determining means for determining as the target preceding vehicle either of the target moving preceding vehicle and the target stationary preceding vehicle which has the smaller of the distances to the system vehicle, if either of the target moving preceding vehicle and the target stationary preceding vehicle is selected, the selected one being determined as the target preceding vehicle, If both the target moving preceding vehicle and the target stationary preceding vehicle are not selected, the target preceding vehicle determining means determining that there is no target preceding vehicle.

The first probability is changed according to the degree of the curve determined by the curve determining means.

The intervehicle distance control means includes (a) a target intervehicle distance determining means for determining a target intervehicle distance to the target preceding vehicle based on an input from a system operator, (b) a target change rate of speed determining means for determining a target change rate of the speed of the system vehicle based on the relative speed of the target preceding vehicle and a difference between the distance to the target preceding vehicle determined by the distance and angular position determining means and the target intervehicle distance, (c) a target vehicle speed determining means for determining a target vehicle speed and updating the target vehicle speed at given control cycles based on the target vehicle speed determined one control cycle earlier and the target change rate determined by the target change rate, and (d) a speed control means for controlling the speed of the system vehicle to agree with the target vehicle speed.

The target intervehicle distance determining means determines a target intervehicle distance time which includes a variable and a given initial value. The variable is changed based on an input from a system operator. The target intervehicle distance is determined by multiplying the target intervehicle distance time by the speed of the system vehicle measured by the speed measuring means.

The target intervehicle distance is defined within a range from given upper to lower limit.

The target vehicle speed determining means increases a response rate of the target vehicle speed is increased when the relative speed of the target preceding vehicle determined by the relative position and speed determining means is changed from an acceleration to a deceleration and vice versa.

When a system operator does not accelerate or decelerate the system vehicle, the target vehicle speed determining means limits the target vehicle speed within a range including the speed of the system vehicle measured by the speed measuring means below a set vehicle speed set under cruise control performed when intervehicle distance control by the intervehicle distance control means is not performed.

When the target preceding vehicle selecting means determines that there is no target preceding vehicle and when the speed of the system vehicle measured by the speed measuring means is greater than the target vehicle speed, the target vehicle speed determining means sets the target vehicle speed to the speed of the system vehicle and then updates the target vehicle speed based on the target vehicle speed determined one control cycle earlier and the target change rate determined by the target change rate. When the target preceding vehicle selecting means determines that there is no target preceding vehicle and when the speed of the system vehicle measured by the speed measuring means is smaller than the target vehicle speed, the target vehicle speed determining means determines the target vehicle speed based on an initial value indicating the target vehicle speed and updates the target vehicle speed based on the target vehicle speed determined one control cycle earlier and the target change rate determined by the target change rate. The target vehicle speed is limited within a range below a set vehicle speed set under cruise control performed when intervehicle distance control by the intervehicle distance control means is not performed.

The relative position and speed determining means determines whether the objects detected by the beam scanning means are moving object or stationary objects based on the relative speeds of the objects and the speed of the system vehicle. A stationary object locus monitoring means is further provided for monitoring loci of one of the stationary objects determined by the relative position and speed determining means relative to the system vehicle at given time intervals. The curve degree determining means determines the degree of the curve based on the loci monitored by the stationary object locus monitoring means and further comprises a cumulating means for cumulating a difference between the neutral position learning angle and the steered angle detected by the steered angle detecting means at the control cycles to determine a cumulative value when the degree of the curve is more than a given value and a correcting means for correcting the neutral position learning angle by subtracting a given value from the neutral position learning angle when an absolute value of the cumulative value exceeds a given value and when the cumulative value is positive. The correcting means adds the given value to the neutral position learning angle when the absolute value of the cumulative value exceeds the given value and when the cumulative value is negative.

The relative position and speed determining means determines whether the objects detected by the beam scanning means are moving objects, stationary objects, or obstacles on a side of the road based on the relative speeds of the objects and the speed of the system vehicle. The same lane probability determining means monitors a relative position of one of the obstacles to the system vehicle or one of the moving objects or the stationary objects to determine whether a lane exists on either side of the system vehicle or not. A result of the determination is used to modify the same lane probabilities.

When a turn indicator of the system vehicle is turn on, the same lane probability determining means shifts the center of the determination of the target preceding vehicle to a direction indicated by the turn indicator according to the speed of the system vehicle.

The same lane probability determining means decreases the same lane probability of the target preceding vehicle when the turn indicator is turned on.

When the turn indicator of the system vehicle is turned on, the same lane probability determining means shifts the center of the determination of the target preceding vehicle to a direction indicated by the turn indicator according to the speed of the system vehicle by correcting at least one of the degree of the curve determined by the curve determining means and components of the relative positions of the objects in a lateral direction of the system vehicle so as to decrease the same lane probabilities of the objects in the direction indicated by the turn indicator according to the speed of the system vehicle.

The same lane probability determining means increases the same lane probabilities of the objects if the relative speeds of the objects represent that the objects are approaching the system vehicle.

The relative position and speed determining means further determines widths of the objects. When the widths of the objects are smaller than a given value, the same lane probability determining means increases the same lane probabilities of the objects.

When the relative speeds of the objects in a lateral direction of the system vehicle is increased, the same lane probability determining means decreases a weight added to the instantaneous same lane probabilities in the weighted averaging operation.

A navigation system using a GPS (Global Positioning System) may be provided. When the target preceding vehicle selecting means determines that the curve exists in a forward direction based on data provided by the navigation system, the objects located at a given distance away from the system vehicle are not selected as the target preceding vehicle.

The initial value of the target intervehicle distance time is determined based on an intervehicle distance to the target preceding object selected by the target preceding vehicle selecting means when the intervehicle distance control means is not in operation.

The target intervehicle distance determining means increases the target intervehicle distance to the target preceding vehicle for a given period of time after the target preceding vehicle is selected.

When the number of objects detected by the beam scanning means is greater than a given value, the target intervehicle distance determining means decreases the target intervehicle distance to the target preceding vehicle.

The speed control means performs cruise control. When a system operator increases a set speed in the cruise control, the target change rate of speed determining means sets the target change rate of the speed of the system vehicle to a first acceleration value. When the system operator decreases the set speed in the cruise control, the target change rate of speed determining means sets the target change rate of the speed of the system vehicle to a given deceleration value. When the target preceding vehicle is not selected by the target preceding vehicle selecting means and when the system operator does not change the set speed in the cruise control, the target change rate of speed determining means sets the target change rate of the speed of the system vehicle to a second acceleration value smaller than the first acceleration value. Within a given period of time after the system driver increases the set speed in the cruise control, the target change rate of speed determining means sets the target change rate of the speed of the system vehicle to the first acceleration value.

When the target change rate of the speed of the system vehicle is smaller than the second acceleration value, the target change rate of speed determining means increases the target change rate of the speed to the second acceleration value gradually.

When the target preceding vehicle is not selected by the target preceding vehicle selecting means and when the turn indicator of the system vehicle is turned on to indicate a direction from a passing lane to a traveling lime, the target change rate of speed determining means decreases the target change rate of the speed.

When the target preceding vehicle is not selected by the target preceding vehicle selecting means and when the turn indicator of the system vehicle is turned on to indicate a direction from a traveling lane to a passing lane, the target change rate of speed determining means increases the target change rate of the speed.

The target change rate of speed determining means determines whether the system vehicle is traveling on a downhill road or not. When the system vehicle is determined as being traveling on the downhill road, the target change rate of speed determining means decreases the target change rate of the speed.

The target change rate of speed determining means decreases the target change rate of the speed as the same lane probability of the target preceding vehicle is lowered.

The target change rate of speed determining means decreases an absolute value of the target change rate of the speed when the target intervehicle distance determined by the target intervehicle distance determining means is greater than a given distance.

The speed control means prohibits the speed of the system vehicle from increasing until the intervehicle distance to the target preceding vehicle exceeds the target intervehicle distance determined by the target intervehicle distance determining means by a given distance.

A weather condition detecting means is further provided for detecting a given weather condition degrading an operation of the beam scanning means. An intervehicle distance control prohibiting means is provided for prohibiting an operation of the intervehicle distance control means when the given weather condition is detected. An alarm means is provided for issuing an alarm when the operation of the intervehicle distance control means is prohibited.

A control operation informing means is provided for informing the system operator that the intervehicle distance control means is in operation.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 9(a) to 9(e) show variations in steered angle θ0 and check steered angle θck where a system vehicle travels through the curve shown in FIG. 7;

DESCRIPTION OF THE PREFERRED EMBODIMENT

Figure 1:
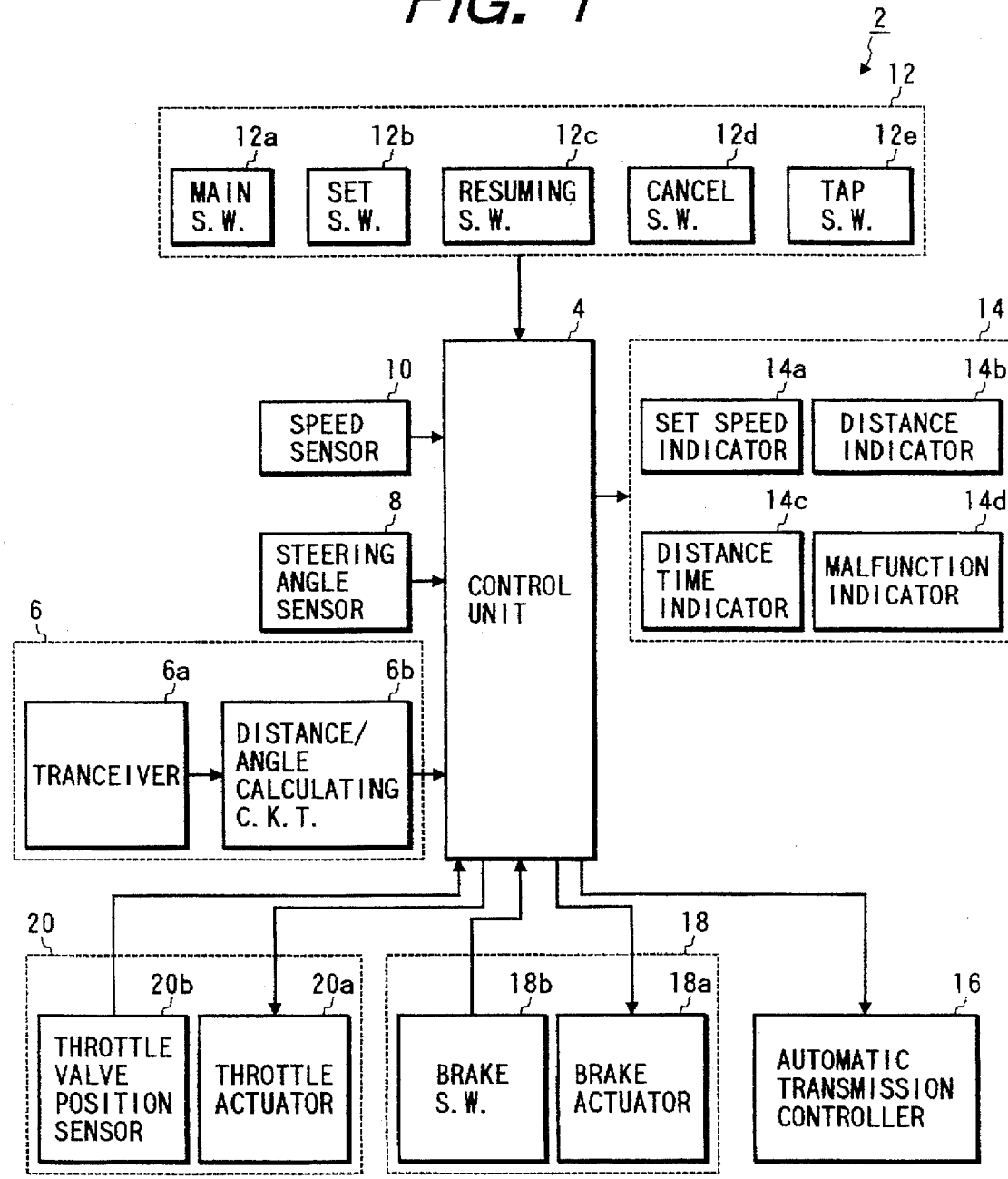
FIG. 1 is a block diagram which shows an intervehicle distance control system according to the present invention.

Referring now to the drawings, wherein like numbers refer to like parts in several views, particularly to FIG. 1, there is shown an intervehicle distance control system 2 according to the present invention which may be incorporated in an automotive vehicle powered by an internal combustion engine.

The intervehicle distance control system 2 is designed to maintain an intervehicle distance between a system vehicle equipped with this system and a preceding vehicle at a set distance under cruise control and includes a control unit 4 provided with a computer, a laser scanning type distance sensor 6, a steering angle sensor 8, a vehicle speed sensor 10, a cruise control switch unit 12, an indicator unit 14, an automatic transmission controller 16, a brake unit 18, and a throttle unit 20.

The control unit 4 includes an input/output interface and various driver circuits and detection circuits whose hardware is well known in the art, and explanation thereof in detail will be omitted here. The control unit 4 performs conventional cruise control to maintain the vehicle speed constant at a pre-set speed in the absence of a preceding vehicle within a forward detection zone.

The distance sensor 6 includes a laser transceiver 6a and a distance/angle calculating circuit 6b. The laser transceiver 6a radiates a laser beam over a given angular range and scans a forward detection zone and receives beams reflected from objects. The distance/angle calculating circuit 6b determines relative speeds of, the distance to, and positional coordinates of the objects. A distance sensor of this type is well known in the art, and explanation thereof in detail will be omitted here. The distance sensor 6 may alternatively provided with a radar unit emitting electromagnetic wave or supersonic wave.

The steering angle sensor 8 monitors a change in steered angle of a steering wheel. When a power source of the intervehicle distance control system 2 is turned on, "0" is set at a steered angle address of a memory of the control unit 4, and monitored changes in steered angle are summed up to determine a relative steered angle. Additionally, a steered angle while the vehicle is traveling straight is determined in a mariner, as described later in detail, and then defined as a reference value for determination of curve data. The steering angle sensor 8 used in this embodiment has a resolution of 2.25°.

The vehicle speed sensor 10 monitors the speed of a wheel to determine the speed of the vehicle. The vehicle speed sensor 10 may be arranged to monitor rotation of an output shaft of a transmission to determine the speed of the vehicle.

The cruise control switch unit 12 includes a main switch 12a, a set switch 12b, a resuming switch 12c, a cancel switch 12d, and a tap switch 12e. The main switch 12a is for starting the cruise control. When the main switch 12a is turned on, the cruise control is performed and intervehicle distance control is also performed. When the set switch 12b is actuated, the control unit 4 measures a vehicle speed Vn and then sets it as a target speed Vm of the cruise control. The resuming switch 12c, if actuated when the cruise control is not in operation and the target speed Vm is stored, returns the current vehicle speed to the target speed Vm. The cancel switch 12d, If actuated during the cruise control, stops the cruise control. The tap switch 12e is, as discussed later in detail, for setting an intervehicle distance between the system vehicle and a target preceding vehicle.

The indicator unit 14 includes a set vehicle speed indicator 14a, a current intervehicle distance indicator 14b, a set intervehicle distance time indicator 14c, and a sensor malfunction indicator 14d. The set vehicle speed indicator 14a indicates a set speed under the cruise control. The current intervehicle distance indicator 14b indicates an intervehicle distance to a target preceding vehicle selected in a manner, as described later, based on the distance measured by the distance sensor 6. The set intervehicle distance time indicator 14c indicates a time distance for controlling the intervehicle distance in a manner, as described later. The sensor malfunction indicator 14d indicates malfunctions of various sensors such as the distance sensor 6 etc.

The automatic transmission controller 16 is responsive to a command from the control unit 4 to select one from among gear positions (i.e., gear ratios) of an automatic transmission required for controlling the vehicle speed of the system vehicle.

The brake unit 18 includes a brake actuator 18a and a brake switch 18b. If an anti-collision action is required, the brake actuator 18a is responsive to a command from the control unit 4 to regulate a brake pressure. The brake switch 18b detects the degree to which a brake pedal is depressed by a vehicle operator or driver.

The throttle unit 20 includes a throttle actuator 20a and a throttle valve position sensor 20b. The throttle actuator 20a is responsive to a command from the control unit 4 to regulate an opening degree of a throttle valve of the internal combustion engine to control the engine power. The throttle valve position sensor 20b detects the opening degree of the throttle valve. For example, a determination of whether the system vehicle is traveling on a downhill road or not may be made by comparing the vehicle speed and the opening degree of the throttle valve.

The control unit 4 has a power switch (not shown) and executes a given program, as will be discussed later, upon turning on of the power switch.

Figure 2:
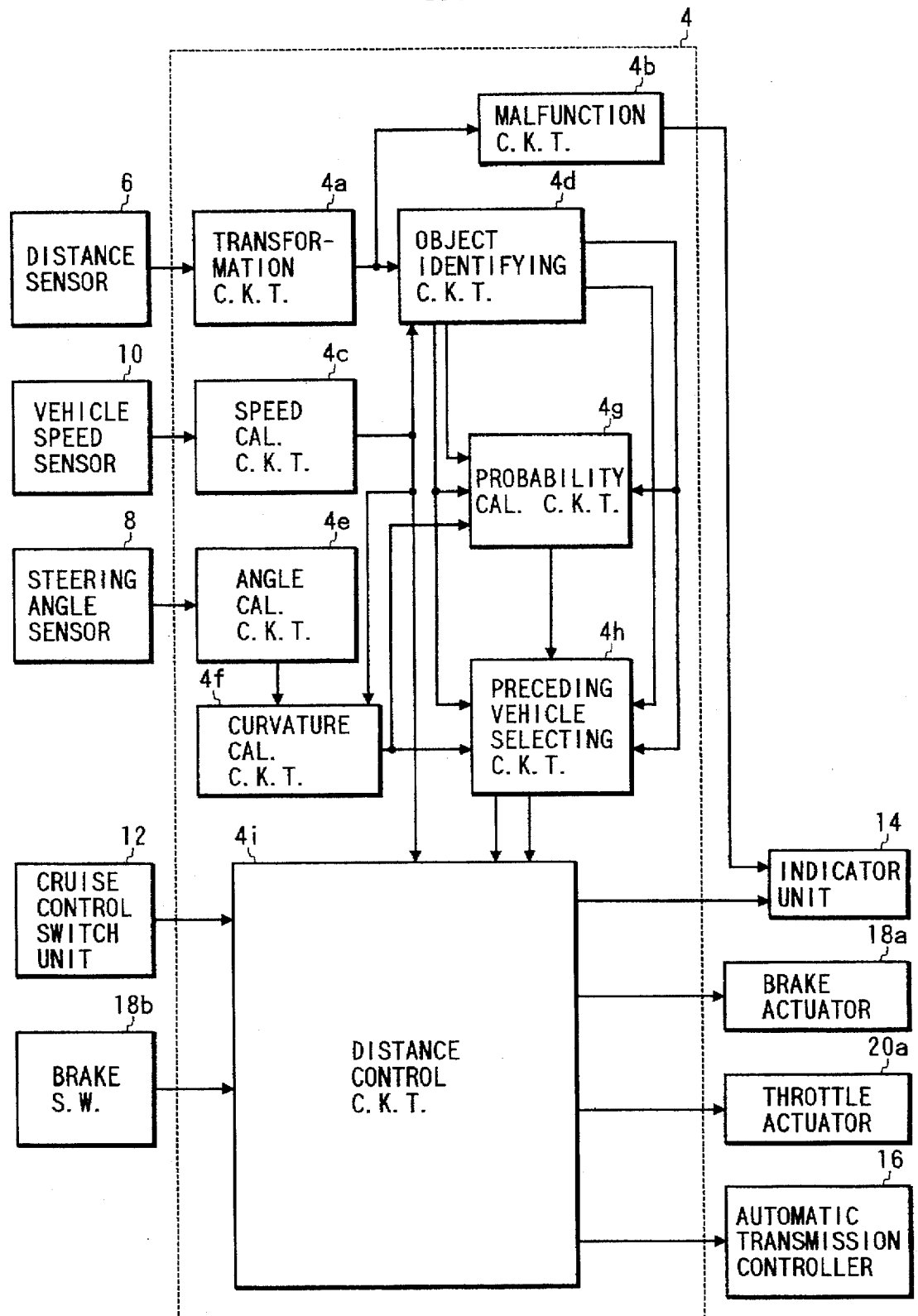
FIG. 2 is a block diagram which shows a circuit structure of a control unit.

Internally, the control unit 4, as shown in FIG. 2, includes a coordinate transformation circuit 4a, a sensor malfunction detecting circuit 4b, an object identifying circuit 4d, a vehicle speed calculating circuit 4c, a steered angle calculating circuit 4e, a curvature calculating circuit 4f, a same lane probability calculating circuit 4g, a preceding vehicle selecting circuit 4h, and an intervehicle distance control circuit 4i.

The coordinate transformation circuit 4a receives data on distances to and angles (i.e., directions) of the objects outputted from the distance/angle calculating circuit 6b of the distance sensor 6 to transform polar coordinates of the objects into x-y rectangular coordinates where a location of the system vehicle is defined as the origin. The sensor malfunction detecting circuit 4b determines whether the x-y rectangular coordinates lie in an allowable range or not. If not, the sensor malfunction detecting circuit 4b outputs a malfunction signal to the sensor malfunction indicator 14d of the indicator unit 14 to indicate that the distance sensor 6 is malfunctioning.

The object identifying circuit 4d determines a type of each of the objects tracked by the distance sensor 6, an object relative speed Vr, an object width W, and x-y coordinates of the center of the object based on the x-y rectangular coordinates derived by the coordinate transformation circuit 4a and the vehicle speed Vn determined by the vehicle speed calculating circuit 4c. The type of the object represents a moving object or a stationary object. For example, if either of the following equations (1) and (2) is satisfied, an object tracked by the distance sensor 6 is identified as a stationary object. Otherwise, the object is identified as a moving object.

$$-1 \times Vry \geq Vn \times 0.7 \qquad (1)$$

$$Vn+Vry \leq 5 \text{ km/h} \qquad (2)$$

However, once the object is identified as a stationary object, it is not identified as a moving object unless equations (3) and (4) below are both satisfied.

$$-1 \times Vry < Vn \times 0.5 \qquad (3)$$

$$Vn+Vry > 10 \text{ km/h} \qquad (4)$$

The steered angle calculating circuit 4e receives a signal from the steered angle sensor 8 to determine a steered angle θ0.

The curvature calculating circuit 4f determines a curvature R of a road based on the vehicle speed derived by the vehicle speed calculating circuit 4c and the steered angle θ0 derived by the steered angle calculating circuit 4e. The same lane probability calculating circuit 4g determines a probability that a preceding vehicle tracked by the distance sensor 6 is traveling on the same traffic lane as the system vehicle based on the curvature R, the type of the object, the object width W, the x-y coordinates of the center of the object derived by the object identifying circuit 4d. The preceding vehicle selecting circuit 4h selects a target preceding vehicle among from objects tracked by the distance sensor 6 based on the curvature R, the same lane probability, the type of object, the relative speed and the x-y coordinates of the center of the object to determine a distance to and a relative speed Vr of the selected target preceding vehicle.

The intervehicle distance control circuit 4i provides control signals to the brake actuator 18a, the throttle actuator 20a, and the automatic transmission controller 16 based on the distance to the target preceding vehicle, the relative speed Vr, the vehicle speed Vn, switching conditions of the cruise control switch unit 12, and a signal from the brake switch 18b for regulating the distance to the target preceding vehicle, and also provides an indicator signal to the indicator unit 14 to inform the driver of current control conditions.

Figure 3A:
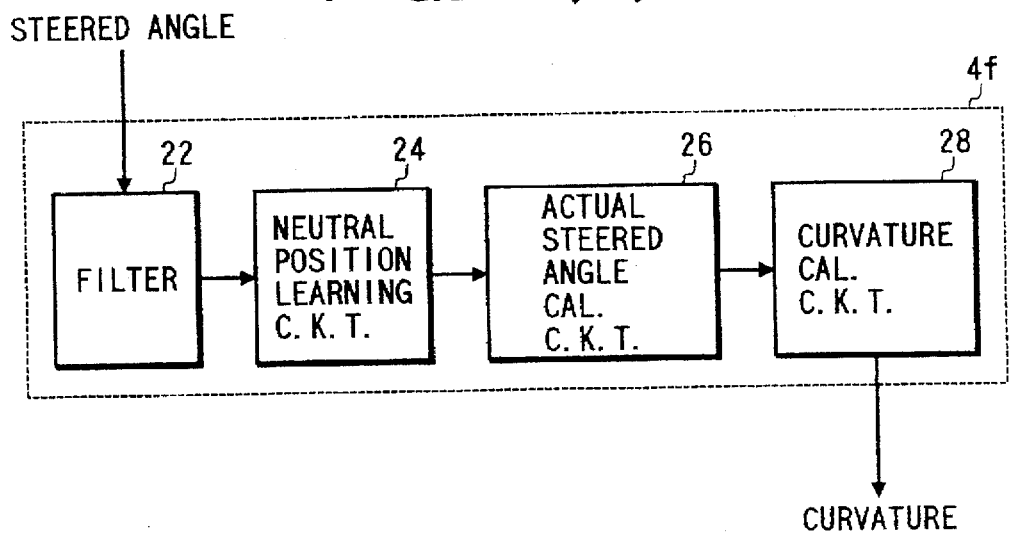
FIG. 3(a) is a circuit diagram of a curvature calculating circuit.

The curvature calculating circuit 4f, as shown in FIG. 3(a), includes a filter section 22, a neutral position learning section 24, an actual steered angle calculating section 26, and a curvature calculating section. The filter section 22 determines an average steered angle per unit time based on the steered angles θ0 derived by the steered angle calculating circuits 4e. The neutral position learning section 24 then leans the average steered angle every control cycle to determine a neutral position of the steering wheel. The actual steered angle calculating section 26 then determines an actual steered angle based on an angle at the neutral position. The curvature calculating section 28 then calculates the curvature R based on the actual steered angle.

Figure 3B:
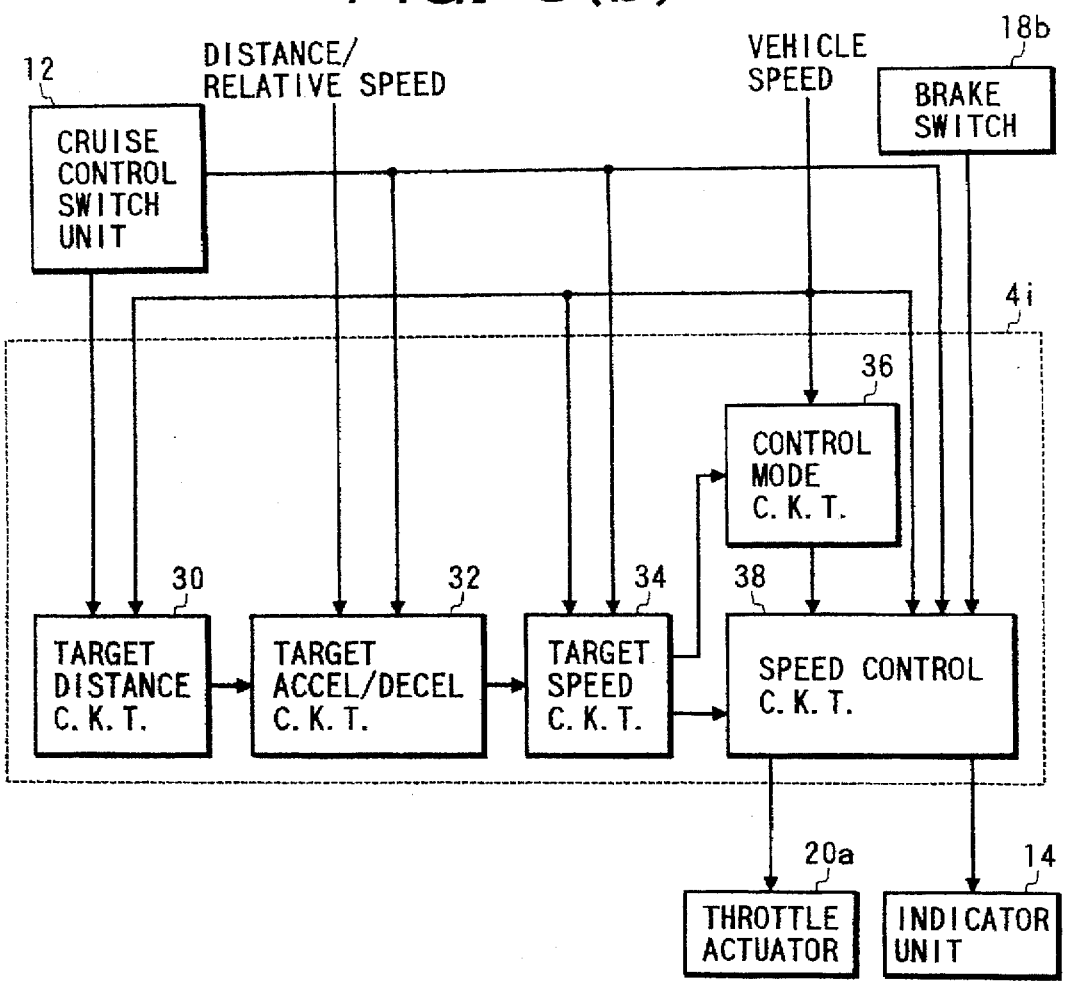
FIG. 3(b) is a circuit diagram of a distance control circuit.

The intervehicle distance control circuit 4$i$, as shown in FIG. 3($b$), includes a target intervehicle distance calculating section 30, a target acceleration/deceleration calculating section 32, a target vehicle speed calculating section 34, a control mode determining section 36, and a vehicle speed control section 38. The intervehicle distance control unit 4$i$ of this embodiment, as will be apparent from the drawing, regulates the opening degree of the throttle valve through the throttle actuator 20$a$ for controlling an intervehicle distance, but it may control the brake actuator 18$a$ and the automatic transmission controller 16 based on detected data for accelerating or decelerating the system vehicle to avoid collision with an object ahead of the system vehicle.

The target intervehicle distance calculating section 30 determines a target intervehicle distance based on switching conditions of the cruise control switch unit 12 and the vehicle speed Vn. However, in this embodiment, a target intervehicle distance time, which will be discussed later in detail, is first determined before the target intervehicle distance is determined and then multiplied by the vehicle speed Vn to determine the target intervehicle distance. The target acceleration/deceleration calculating section 32 determines a target acceleration/deceleration value based on the target intervehicle distance, the switching conditions of the cruise control switch unit 12, a distance to and a relative speed of the target preceding vehicle. The target vehicle speed calculating section 34 then determines a target vehicle speed Vm based on the target acceleration/deceleration value and the switching conditions of the cruise control switch unit 12. The control mode determining section 36 then determines whether throttle valve fully closing control should be performed or not based on the target vehicle speed Vm and the actual vehicle speed Vn. If control of the brakes and the automatic transmission is also required, the control mode determining section 36 determines whether the control of the brakes and the automatic transmission should be performed or not.

The vehicle speed control section 38 then controls the throttle actuator 20$a$ to regulate the opening degree of the throttle valve based on the results of determination of the control mode determining section 36, the target vehicle speed Vm, the vehicle speed Vn, and the switching conditions of the cruise control switch unit 12 and the brake switch 18$b$. The status of the throttle valve control performed by the vehicle speed control section 38 is shown in real time through the indicator unit 14.

Figure 4:
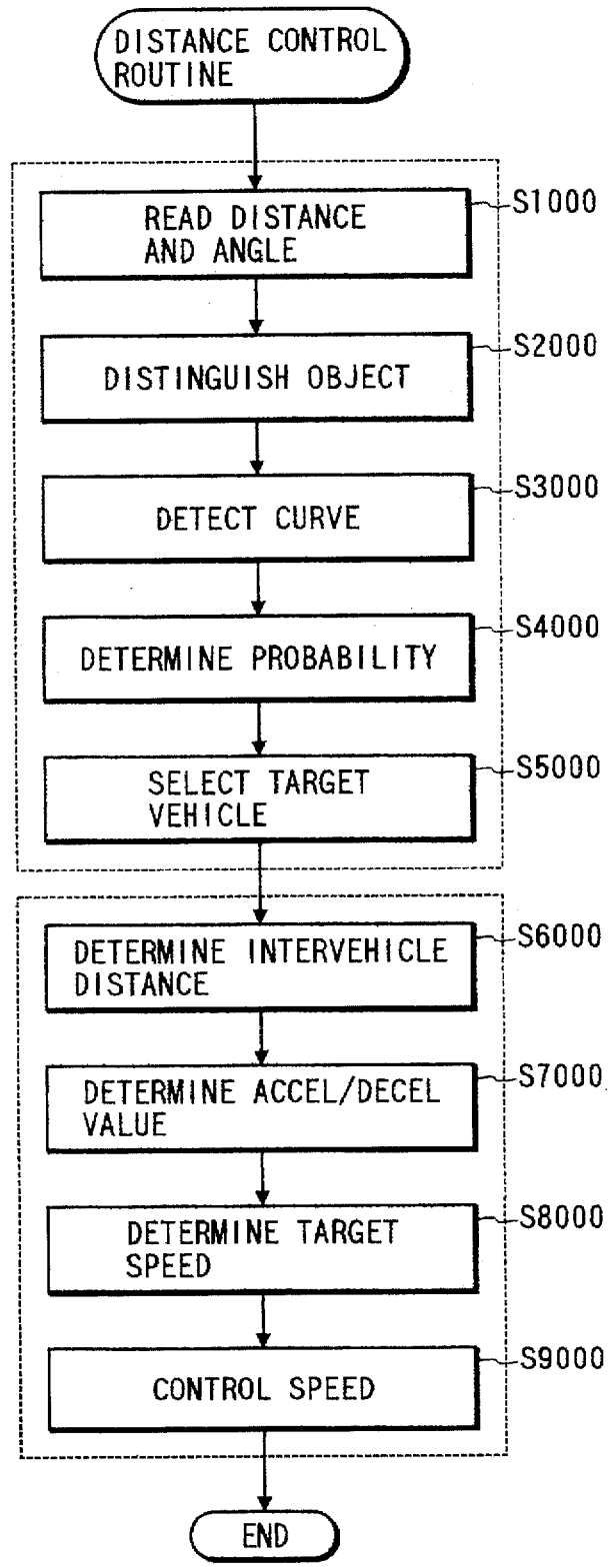
FIG. 4 is a flowchart which shows a distance control routine performed by an intervehicle distance control system.

FIG. 4 shows a flowchart of a program or sequence of logical steps which are carried out by the control unit 4 at control cycles of 0.2 sec.

After entering the program, the routine proceeds to step 1000 wherein distances to and angles of objects tracked by the intervehicle distance sensor 6 are read in the control unit 4. The routine then proceeds to step 2000 wherein a type of each object, the object width W, x-y coordinates of the center of the object, and the relative speed Vr are determined. For example, if a relative position of the object is hardly changed although the system vehicle is traveling, the object is identified as a moving object. In addition, if the object is moving away from the system vehicle, it is also identified as the moving object. Alternatively, if the relative position of the object approaching the system vehicle at the same speed as that of the system vehicle, the object is identified as a stationary object. In other cases, for example, if a given period of time sufficient for distinguishing the type of the object does not expire, the object is determined as an unidentified object. These object identifying techniques are well known in the art.

Figure 5:
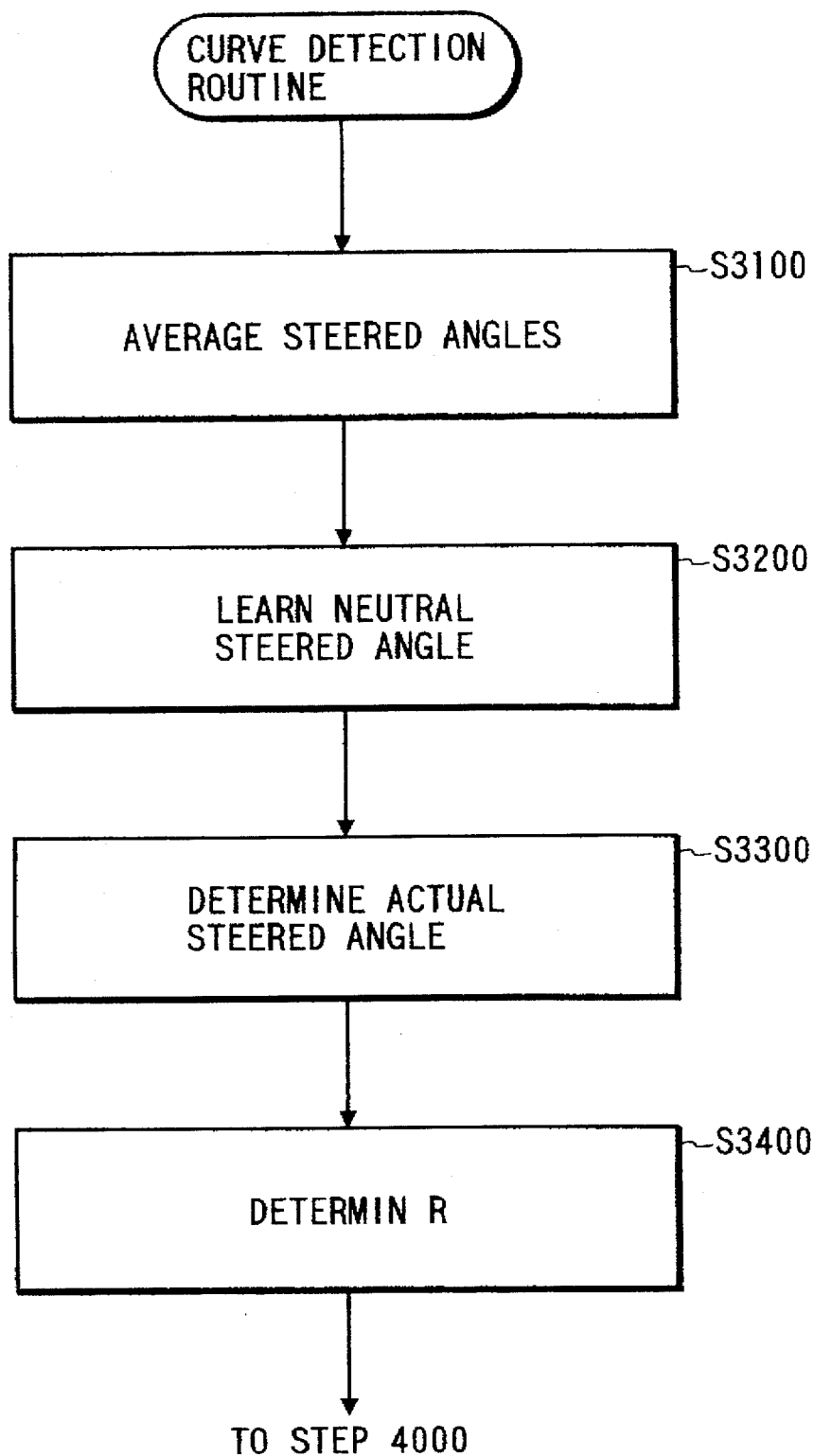
FIG. 5 is a flowchart which shows a curvature determination routine.

The routine then proceeds to step 3000 wherein the curvature R is determined in a curvature determination process as shown in FIG. 5. In step 3100, the steered angle θ0 detected by the steered angle sensor 8 is modified at every control cycle to determine an average steered angle θa0 in the following manner.

If a learning prohibiting counter value Cgs, as will be described later in detail, is smaller than 25 (Cgs<25) and if the vehicle speed Vn is greater than 20 km/h (Vn>20 km/h), the average steered angle θa0 is given by the equation (5) below.

$$\theta a0 \leftarrow \theta a0 \times 0.7 + \theta 0 \times 0.3 \qquad (5)$$

If the learning prohibiting counter value Cgs is greater than or equal to 25 (Cgs≧25) and if the vehicle speed Vn is greater than 20 km/h (Vn>20 km/h), the average steered angel θa0 is given by the equation (6) below.

$$\theta a0 \leftarrow \theta a0 \times 0.3 + \theta 0 \times 0.7 \qquad (6)$$

If the vehicle speed Vn is smaller than or equal to 20 km/h (Vn≦20 km/h), the average steered angel θa0 is given by the equation (7) below.

$$\theta a0 \leftarrow \theta 0 \qquad (7)$$

Specifically, If the vehicle speed Vn is greater than 20 km/h and a variation in steered angle is stable (Cgs<25), a time-averaging operation (i.e., a weighted averaging operation) on the detected steered angle θ0 is carried out at a lower following level to derive the average steered angle θa0. Alternatively, if the variation in steered angle is unstable (Cgs≧25), the average steered angle θa0 is determined at a higher following level. This means that if a change in steered angle is great at the beginning or end of a curve, the average steered angle θa0 is changed quickly according to a change in detected steered angle. It is because the quick change in detected steered angle θ0 indicates an active steering operation, allowing an actual steered angle to be expressed by the detected steered angle θ0. Alternatively, during traveling straight or turning, the averaging operation at the lower following level minimizes the influence of vibration of the steering wheel on the detected steered angle θ0.

Figure 7:
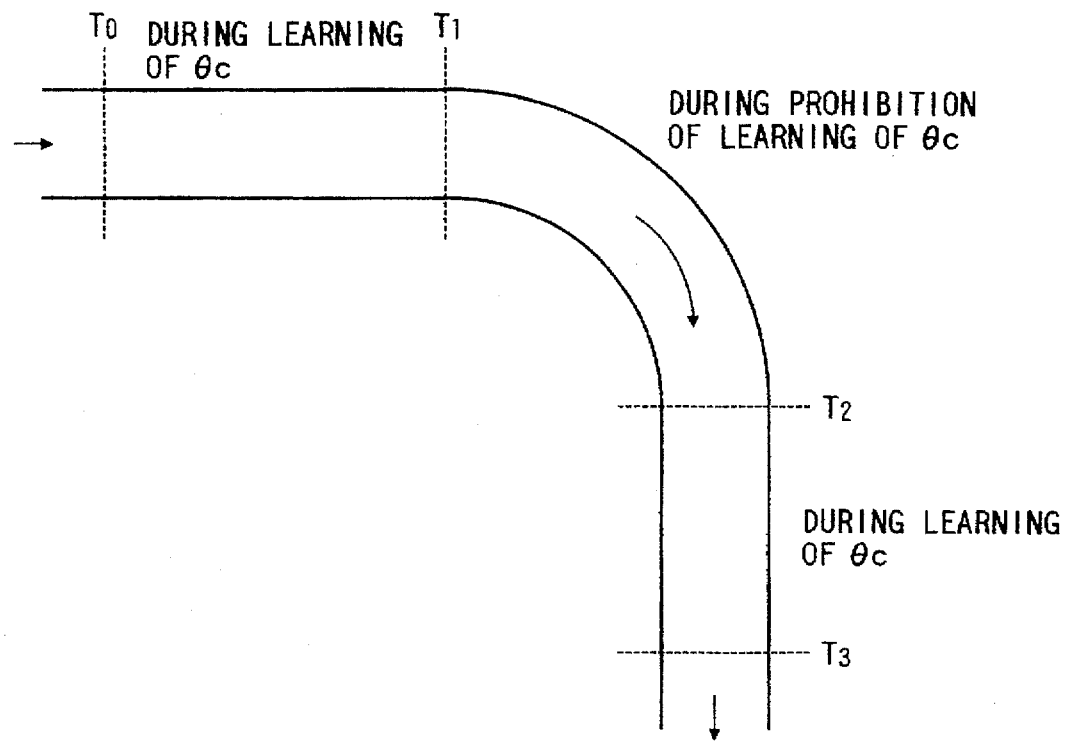
FIG. 7 is an illustration which shows a curved road for explanation of a neutral position learning process.

FIGS. 8($a$) to 8($d$) show variations of the detected steered angle θ0 and the average steered angle θa0 when the system vehicle travels through a curve shown in FIG. 7. FIG. 8($b$) shows the average steered angle θa0 according to the above equations in step 3100. FIG. 8($c$) shows the average steered angle θa0 derived only by the equation (5). FIG. 8($d$) shows the average steered angle θa0 derived only by the equation (6). The average steered angle θa0 derived only by the equation (7) is identical with the detected steered angle θ0 in FIG. 8($a$).

The learning prohibiting counter value Cgs is set under a given condition in the subsequent step 3200 and then decremented every control cycle of 0.2 sec.

Figure 6:
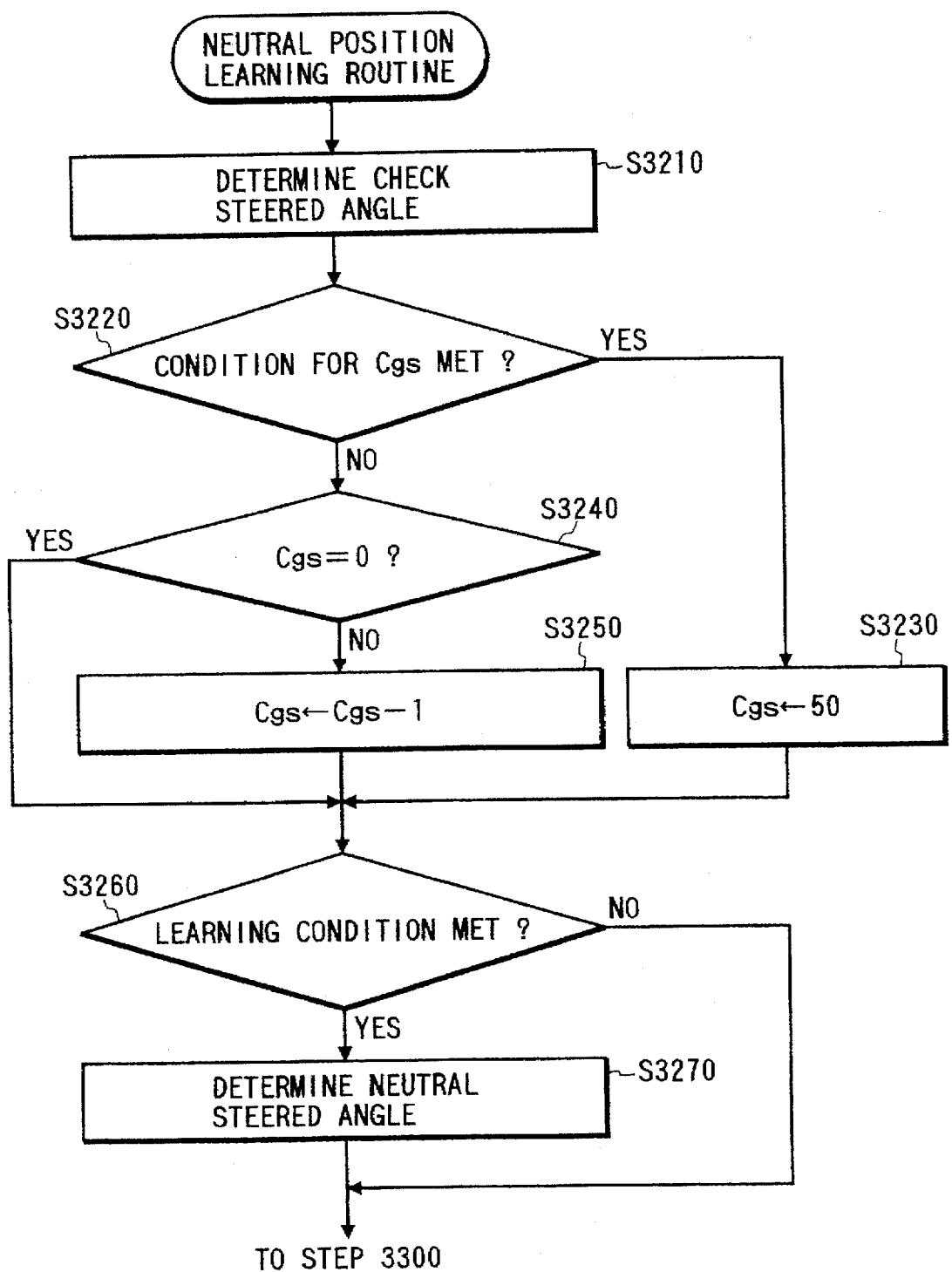
FIG. 6 is a flowchart which shows a neutral position learning routine.

After step 3100, the routine proceeds to step 3200 wherein a steered angle θc at the neutral position of the steering wheel is learned. The neutral position indicates an angular position of the steering wheel while the system vehicle is traveling straight. First, in step 3210 shown in FIG. 6, a check steered angle θck is determined in the following manner.

If the learning prohibiting counter value Cgs is smaller than 25 (Cgs<25) and if the vehicle speed Vn is greater than 20 km/h (Vn>20 km/h), the check steered angle θck is given by the equation (8) below.

$$\theta ck \leftarrow \theta ck \times 0.99 + \theta 0 \times 0.01 \qquad (8)$$

If the learning prohibiting counter value Cgs is greater than or equal to 25 (Cgs≧25) and if the vehicle speed Vn is greater than 20 km/h (Vn>20 km/h), the check steered angle θck is given by the equation (9) below.

$$\theta ck \leftarrow \theta ck \times 0.3 + \theta 0 \times 0.7 \qquad (9)$$

If the vehicle speed Vn is smaller than or equal to 20 km/h (Vn≦20 km/h), the check steered angle θck is given by the equation (10) below.

$$\theta ck \leftarrow \theta ck \times 0.5 + \theta 0 \times 0.5 \qquad (10)$$

Specifically, if the detected steered angle θ0 is stable, the steered angle θ0 is, as shown in the equation (8), weighted slightly to decrease a following level of the check steered angle θck to the steered angle θ0 greatly. Alternatively, If the detected steered angle θ0 is unstable, the steered angle θ0 is, as shown in the equation (9), weighted greatly to increase the following level of the check steered angle θck to the steered angle θ0. In other cases, an intermediate following level, as shown in the equation (10), is provided.

FIGS. 9(a) to 9(e) show variations in steered angle θ0 and check steered angle θck when the system vehicle travels through the curve shown in FIG. 7. FIG. 9(b) shows the check steered angle θck according to the above equations in step 3310. FIG. 9(c) shows the check steered angle θck derived only by the equation (8). FIG. 9(d) shows the check steered angle θck derived only by the equation (9). FIG. 9(e) shows the check steered angle θck derived only by the equation (10).

Subsequently, the routine proceeds to step 3220 wherein it is determined whether a setting condition for the learning prohibiting counter value Cgs is encountered or not. The setting condition is that the vehicle speed Vn is greater than 20 km/h and an absolute value |θck−θ0| is greater than 2.25×4 deg.

If a YES answer is obtained in step 3220, then the routine proceeds to step 3230 wherein the leaning prohibiting counter value Cgs is set to 50 (corresponding to 10 sec.). Since one control cycle is, as described above, 0.2 sec., the counter value 50 corresponds to 50 control cycles.

Alternatively, if a NO answer is obtained in step 3220, then the routine proceeds to step 3240 wherein it is determined whether the learning prohibiting counter value Cgs is zero (0) or not. If a YES answer is obtained (Cgs=0), then the routine proceeds to step 3260 maintaining the leaning prohibiting counter value as is. Alternatively, if a NO answer is obtained (Cgs≠0), then the routine proceeds to step 3250 wherein the learning prohibiting counter value Cgs is decreased by one (1).

In step 3260, it is determined whether neutral steered angle leaning conditions (a), (b), and (c), as shown below, for determining the neutral steered angle θc are all satisfied or not.

(a) the vehicle speed>30 km/h (b) the learning prohibiting counter value Cgs=0

(c) |θck−θ0|<2.25×2 deg

If the above conditions (a) to (c) are all satisfied, then the routine proceeds to step 3270 wherein the neutral steered angle θc at the neutral position of the steering wheel is given by the following equation (11).

$$\theta c \leftarrow \theta c \times (1-K) + \theta 0 \times K \qquad (11)$$

where K is given by the equation (12) below.

$$K \leftarrow \alpha / Cst \qquad (12)$$

where α is, as shown in the table 1 below, determined according to the vehicle speed Vn, and Cst is a learning degree counter value which is determined by the equation (13) below.

TABLE 1

| vehicle speed (km/h) | α |
|---|---|
| 0–20 | 0 |
| 20–40 | 1 |
| 40–60 | 2 |
| 60–80 | 3 |
| 80–100 | 4 |
| 100– | 5 |

$$Cst \leftarrow Cst + \alpha \qquad (13)$$

Note that an initial value of Cst is zero (0), and an upper limit thereof is 50,000, but may alternatively not be limited. Usually, it is necessary to set the upper limit under restrictions of hardware.

Since operations on the above equations (11) to (13) are repeated at the control cycles of 0.2 sec., a value of K is decreased gradually. In other words, the neutral steered angle θc approaches a fixed angle as the learning process is repeated. Thus, a value of the neutral steered angle θc is converged after the learning process is performed given times. It is, however, advisable that the neutral steered angle θc be corrected by the detected steered angle θ0 for eliminating learning errors.

After step 3270 or if a NO answer is obtained in step 3260, step 3200 terminates, and then the routine proceeds to step 3300 wherein an actual steered angle θ is determined in the following manner.

If the vehicle speed>20 km/h and Cst≧6, then the actual steered angle θ is given by the equation (14) below.

$$\theta \leftarrow \theta a 0 - \theta c \qquad (14)$$

Alternatively, if the above conditions are not encountered, then the actual steered angle θ is given by the equation (15) below.

$$\theta \leftarrow 0 \qquad (15)$$

The reason why the actual steered angle θ is set to zero (0) in the equation (15) is that a steered angle of a vehicle during traveling at a low speed on a curved road is usually small. The actual steered angle θ may alternatively be corrected by the equation (14) regardless of the vehicle speed and the learning degree counter value Cst.

After step 3300, the routine proceeds to step 3400 wherein the curvature R of a road is determined according to equation (16) below.

$$R \leftarrow f(Vn)/\theta \tag{16}$$

where f(Vn) is a function determined by motion characteristics of a vehicle which are well known in the art as a function for determining a radius of a curved road based on a steered angle, and explanation thereof in detail will be omitted here.

Figure 10:
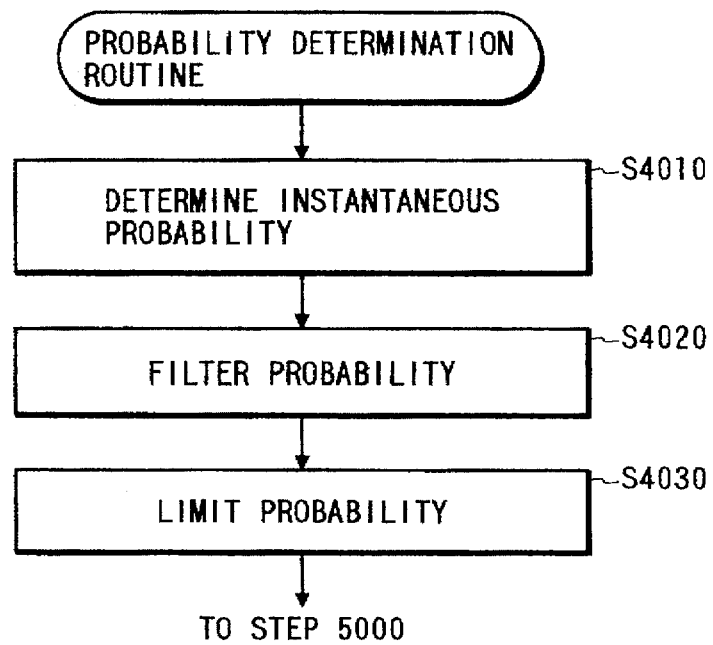
FIG. 10 is a flowchart which shows a same lane probability determination routine.
Figure 8A:
FIGS. 8(a) to 8(d) show variations in detected steered angle θ0 and average steered angle θa0 when a system vehicle travels through the curve shown In FIG. 7.
Figure 8B:
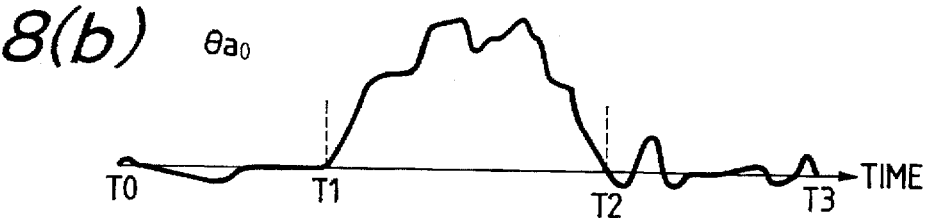
Figure 8C:
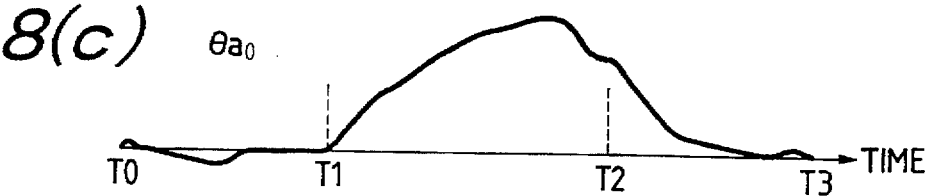
Figure 8D:

After the curvature R is determined in step 3400, step 3000 terminates, and then the routine proceeds to step 4000 wherein a same lane probability is determined according to steps as shown in FIG. 10.

First, in step 4010, instantaneous same lane probabilities of the objects detected by the distance sensor 6 are determined in the following manner. The central positions (X0, Y0) and the object widths (W0) of all objects obtained in step 2000 are converted into parameters in terms of a straight road. Specifically, a road having the curvature R obtained in step 3000 is mathematically transformed into a straight road and then coordinates of each object if it exists on the straight road are determined. This transformation is given by the following equations.

$$X \leftarrow X0-(Y0 \times Y0/2R) \tag{17}$$

$$Y \leftarrow Y0 \tag{18}$$

$$W \leftarrow W0 \tag{19}$$

As will be apparent from the above equations, only an x-coordinate is transformed.

Figure 11:
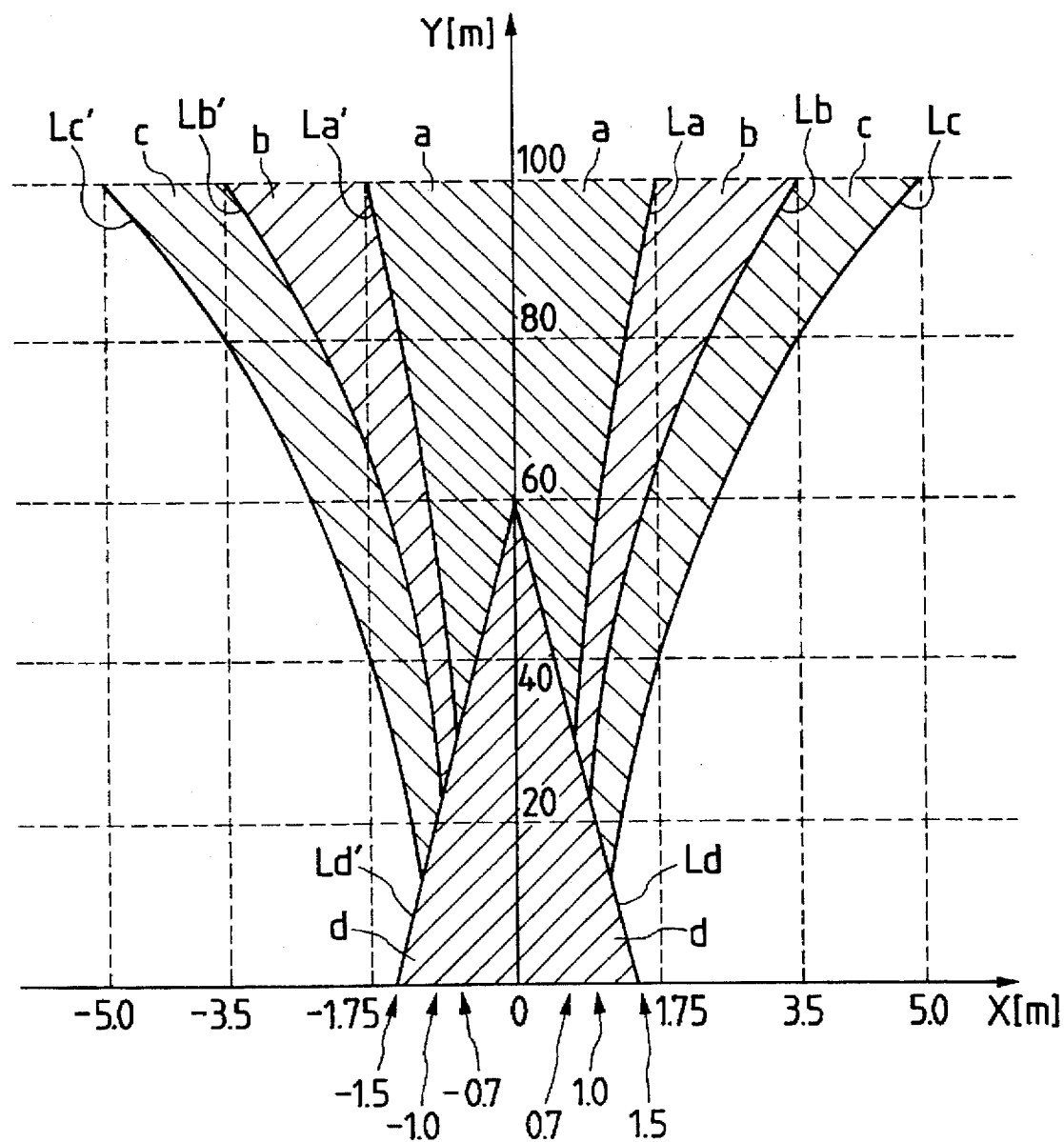
FIG. 11 is a map which shows a same lane probability distribution.

The parameters (X, Y, W) of each object thus derived are then plotted on a same lane probability distribution map shown in FIG. 11 to determine the instantaneous same lane probability, that is, a probability that the object now exists in the same traffic lane as the system vehicle. It is because a difference, or error usually exits between the curvature R determined based on the steered angle and the actual curvature of the road.

In FIG. 11, an abscissa axis (x-axis) extends in a lateral direction of the system vehicle, while an ordinate axis (y-axis) indicates a longitudinal center line of the system vehicle extending forward. FIG. 11 shows a 5 m×100 m probability distribution area which includes a zone a (a same lane probability of 80%), a zone b (a same lane probability of 60%), a zone c (a same lane probability of 30%), a zone d (a same lane probability of 100%), and the remaining zone (a same lane probability of 0%). These zones are determined experimentally. Particularly, the zone d is provided taking into consideration a case where a vehicle traveling in an adjacent lane pulls in front of the system vehicle.

Boundary lines La, Lb, Lc, and Ld defining the zones a, b, c, and d are given by the relations below. Boundary lines La', Lb', Lc', and Ld' are in symmetrical relation to the boundary lines La, Lb, Lc, and Ld with respect to the y-axis.

$$La: X=0.7+(1.75-0.7) \cdot (Y/100) \cdot (Y/100) \tag{20}$$

$$Lb: X=0.7+(3.5-0.7) \cdot (Y/100) \cdot (Y/100) \tag{21}$$

$$Lc: X=1.0+(5.0-1.0) \cdot (Y/100) \cdot (Y/100) \tag{22}$$

$$Ld: X=1.5 \cdot (1-Y/60) \tag{23}$$

The above equations can be written in general form as follows:

$$La: X=A1+B1 \cdot (Y/C1) \cdot (Y/C1) \tag{24}$$

$$Lb: X=A2+B2 \cdot (Y/C2) \cdot (Y/C2) \tag{25}$$

$$Lc: X=A3+B3 \cdot (Y/C3) \cdot (Y/C3) \tag{26}$$

$$Ld: X=A4 \cdot (B4-Y/C4) \tag{27}$$

From the equations (24) to (27), the zones a, b, c, and d are experimentally defined under conditions below.

$$A1 \leq A2 \leq A3 \leq A4 \tag{28}$$

$$B1 \leq B2 \leq B3 \text{ and } B4=1 \tag{29}$$

$$C1=C2=C3 \text{ (C4 is free)} \tag{30}$$

The boundary lines La, Lb, Lc, La', Lb', and Lc' are defined by parabolas for the computing speed, but they are preferably defined by arcs. The boundary lines Ld and Ld' are also preferably defined by arcs or parabolas expanding in an outward direction (i.e., a lateral direction of the system vehicle).

The instantaneous same lane probability P0 of each object is determined as follows:

(1) an object existing in at least a portion of the zone d→P0=100%
(2) an object existing at its center in the zone a→P0=80%
(3) an object existing at its center in the zone b→P0=60%
(4) an object existing at its center in the zone c→P0=30%
(5) an object not meeting the above conditions (1) to (4)→P0=0%

Subsequently, the routine proceeds to step 4020 wherein the instantaneous same lane probability of each object thus determined is time-averaged through a filter to obtain a same lane probability P using equations 31 and 32 below. Note that an initial value of the same lane probability is 0%.

$$P \leftarrow P \times 0.8+P0 \times 0.2 \quad (P0<90\%) \tag{31}$$

$$P \leftarrow P \times 0.7+P0 \times 0.3 \quad (P0 \geq 90\%) \tag{32}$$

The reason that the weight added to the instantaneous same lane probability is great when $P0 \geq 90\%$ is because it is preferable that the control be performed quickly if another vehicle traveling in an adjacent lane pulls in front of the system vehicle.

After the same lane probability P of each object is determined in step 4020, the routine proceeds to step 4030 wherein the same lane probability P is corrected under conditions below.

Figure 12:
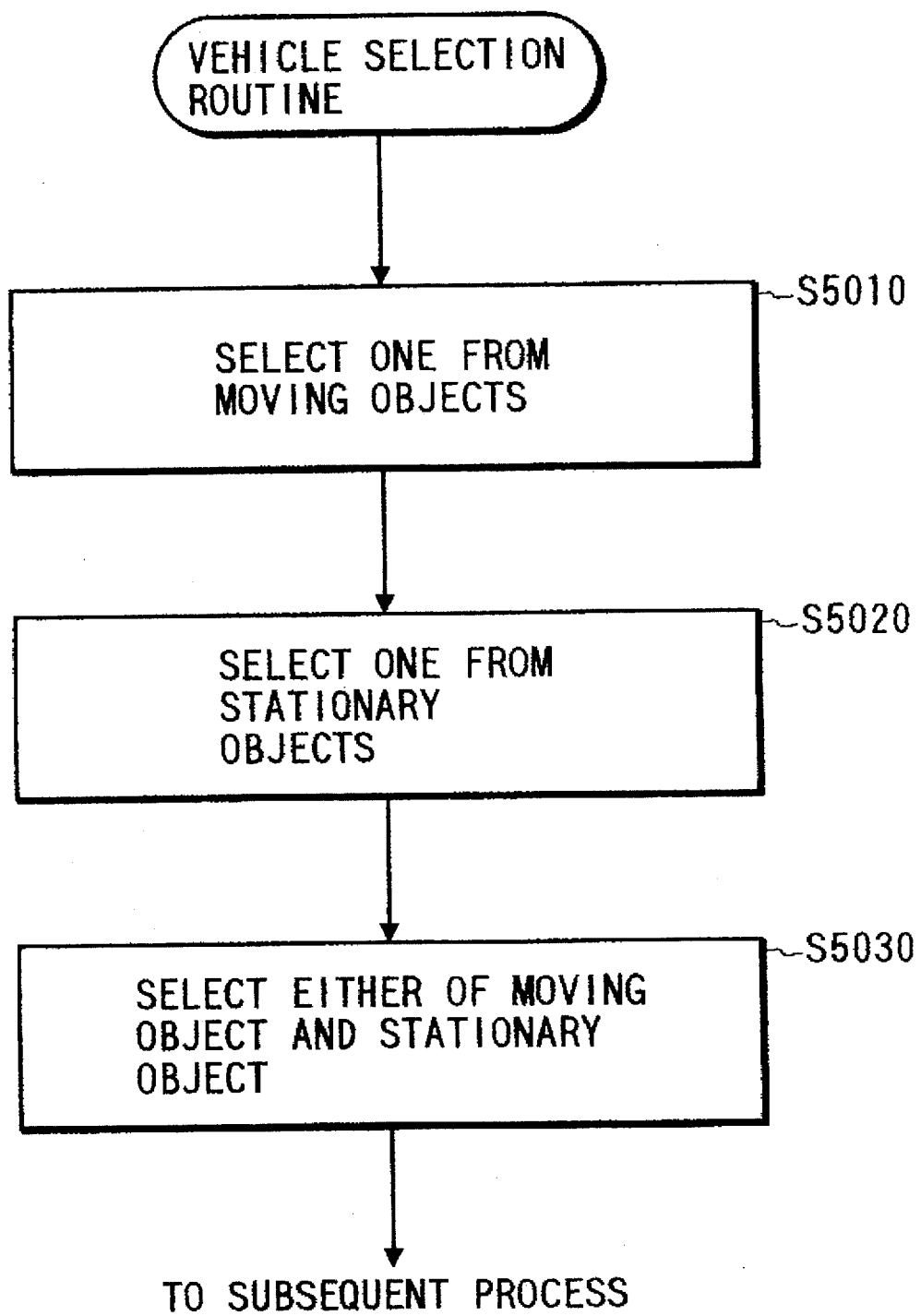
FIG. 12 is a flowchart which shows a target preceding vehicle selection routine.

(1) If the type of the object represents a moving object, then the same lane probability obtained by the equation (31) or (32) is used as is.
(2) If the type of the object represents a stationary object, and if any one of conditions (a) to (e) below is encountered, then a maximum value of the same lane probability P is set to 20%.
 (a) Y0>40 m and W0<1.4 m
 (b) Y0>30 m and W0<1.2 m
 (c) Y0>20 m and W0<1.0 m
 (d) The elapsed time from detection of the object is less than one (1) sec. (i.e., less than 5 scans)
 (e) Another object having a same lane probability P of more than or equal to 50% ($P \geq 50\%$), tracked for a longer time than that of the object exists After the same lane probability of each object is determined in the above manner in step 4000, the routine proceeds to step 5000 wherein from among the objects having the same lane probabilities P determined in step 4000, a target preceding vehicle is selected according to steps, as shown in FIG. 12.

First, in step 5010, the objects are classified into moving objects and stationary objects, and one traveling preceding vehicle is selected out of the moving objects in a manner as discussed below. The routine then proceeds to step 5020 wherein one stationary preceding vehicle is selected out of the stationary objects in a manner as discussed below.

SELECTION OF TRAVELING PRECEDING VEHICLE (Step 5010)

(1) A moving object or objects having the greatest same lane probability P and satisfying the following conditions (a) to (c) are selected.

(a) When $|R|<500$ m, the same lane probability $P>30\%$
(b) When $500 \text{ m} \leq |R| < 1000$ m, the same lane probability $P>40\%$
(c) When $1000 \text{ m} \leq |R|$, the same lane probability $P>50\%$ The reason that the object having a smaller same lane probability P is selected as an absolute value of the curvature R is decreased is because it becomes more difficult to find a preceding vehicle as the absolute value of the curvature R is decreased. (2) If a plurality of objects are selected in the above step (1), from among moving objects having same lane probabilities P greater than the maximum same lane probability minus 15% or moving objects having same lane probabilities P greater than 70%, one having the smallest value of Y0 is selected as a traveling preceding vehicle.

If no moving object is selected in the step (1), it is concluded that there is no preceding vehicle traveling in front of the system vehicle.

SELECTION OF STATIONARY OBJECT (Step 5020)

(1) From among the stationary objects having same lane probabilities P more than or equal to 70% ($P \geq 70\%$), one having the smallest value of Y0 is selected as a stationary preceding vehicle. If no stationary object is selected, it is concluded that there is no stationary preceding vehicle in front of the system vehicle. Note that the selecting condition of the stationary objects is more severe than that of the moving objects for preventing obstacles on the sides of a road from being identified as preceding vehicles.

After steps 5020, the routine proceeds to step 5020 wherein a target preceding vehicle is ultimately selected from the traveling preceding vehicle determined in step 5010 and the stationary preceding vehicle determined in step 5020 in the following manner.

(1) If both the traveling preceding vehicle and the stationary preceding vehicle do not exist in front of the system vehicle, it is concluded that there is no preceding vehicle within the forward detectable zone.

(2) If either the traveling preceding vehicle or the stationary preceding vehicle exists, it is selected as the target preceding vehicle.

(3) If both the traveling preceding vehicle and the stationary preceding vehicle exist, one having a smaller value of Y0 is selected as the target preceding vehicle.

Therefore, even if the target preceding vehicle is mistakenly selected or has been lost out of the forward detectable zone, it is not objectionable because the latest target preceding vehicle is selected from among a plurality of objects tracked by the distance sensor 6 every control cycle.

After the target preceding vehicle is determined in steps 1000 to 5000, the intervehicle distance control is initiated in step 6000.

Figure 13:
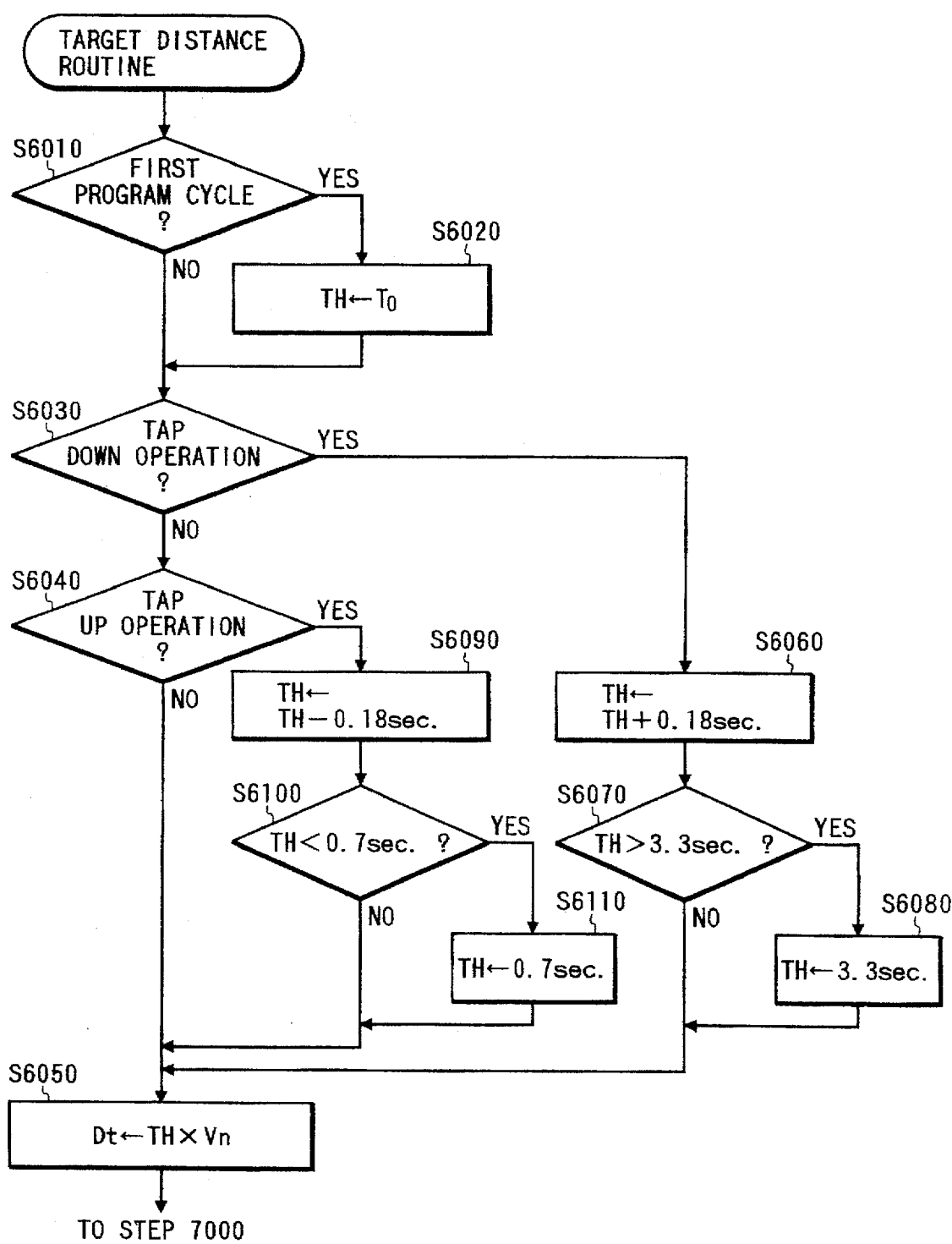
FIG. 13 is a flowchart which shows a target intervehicle distance determination routine.

After entering step 6000, the routine proceeds to step 6010 shown in FIG. 13 wherein it is determined whether the program operation is a first control activation immediately after the power source is turned on or not. If a YES answer is obtained, then the routine proceeds to step 6020 wherein an initial value T0 is provided as a target intervehicle distance time TH. The initial value T0 is set to 2.5 sec., for example.

After step 6020 or if a NO answer is obtained in step 6010, then the routine proceeds directly to step 6030 wherein it is determined whether a tap down operation has been performed or not. If a NO answer is obtained, then the routine proceeds to step 6040 wherein a tap up operation has been performed or not.

The tap down operation is such that the vehicle operator or driver actuates the tap switch 12e of the cruise control switch unit 12 for increasing an intervehicle distance to the target preceding vehicle. Conversely, the tap up operation is such that the driver actuates the tap switch 12e for decreasing the intervehicle distance.

If a YES answer is obtained in step 6030 meaning that the tap down operation has been performed, then the routine proceeds to step 6060 wherein the target intervehicle distance time TH is increased according to the following relation.

$$TH \leftarrow TH + 0.18 \text{ sec.} \qquad (33)$$

After step 6060, the routine proceeds to step 6070 wherein it is determined whether the target intervehicle distance time TH is greater than 3.3 sec. or not. If a YES answer is obtained, then the routine proceeds to step 6080 wherein the target intervehicle distance time TH is set to an upper limit of 3.3 sec. Alternatively, if a NO answer is obtained in step 6070, then the routine proceeds directly to step 6050.

If a YES answer is obtained in step 6040 meaning that the tap up operation has been performed, then the routine proceeds to step 6090 wherein the target intervehicle distance time TH is decreased according to the following relation.

$$TH \leftarrow TH - 0.18 \text{ sec.} \qquad (34)$$

The routine then proceeds to step 6100 wherein it is determined whether the target intervehicle distance time TH is smaller than 0.7 sec. or not. If a YES answer is obtained, then the routine proceeds to step 6110 wherein the target intervehicle distance time TH is set to a lower limit of 0.7 sec. Alternatively, if a NO answer is obtained in step 6100, then the routine proceeds directly to step 6050.

In step 6050, the target intervehicle distance time TH is converted into a target intervehicle distance Dt using the vehicle speed Vn according to the equation (35) below.

$$Dt \leftarrow TH \times Vn \qquad (35)$$

Subsequently, the routine proceeds to step 7000.

Figure 14:
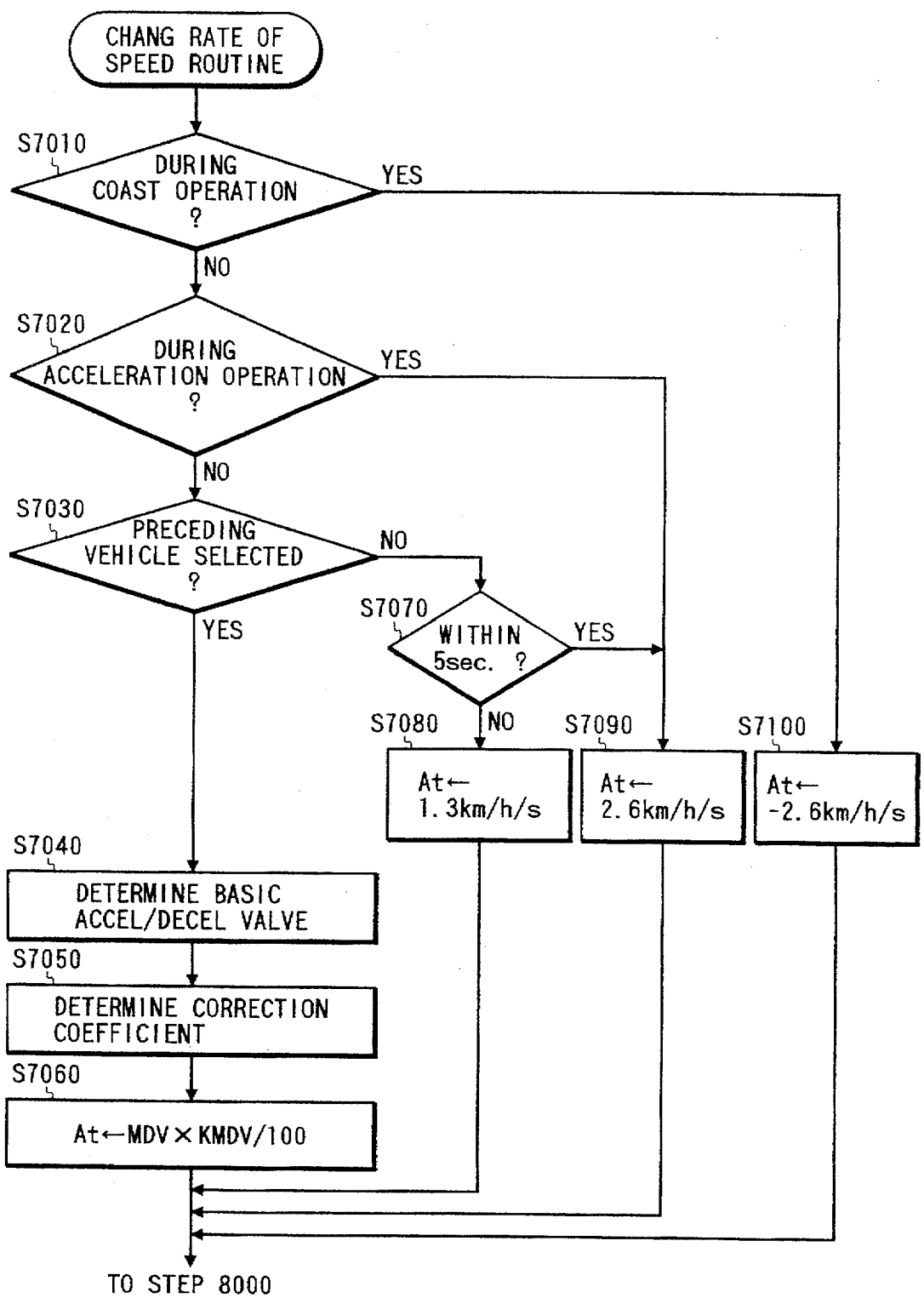
FIG. 14 is a flowchart which shows a change rate of speed determination routine.

After entering step 7000, the routine proceeds to step 7010 shown in FIG. 14 wherein it is determined whether the system vehicle is in a coast operation or not. If a NO answer is obtained, then the routine proceeds to step 7020 wherein it is determined whether the system vehicle is in an acceleration operation or not. If a NO answer is obtained, then the routine proceeds to step 7030 wherein it is determined whether the target preceding vehicle has been selected or not.

The coast operation is such that upon depression of the set switch 12b during the cruise control, the vehicle speed Vn is controlled to be decreased and then maintained at a speed when the set switch 12b is released (i.e., the target vehicle speed Vm). The time during which the system vehicle is in the coast operation indicates the time during which the vehicle speed Vn is decreased. The acceleration operation is such that upon depression of the resuming switch 12c during the cruise control, the vehicle speed Vn is controlled to be increased and then maintained at a speed when the resuming switch 12c is released (i.e., the target vehicle speed Vm). The time during which the system vehicle is in the acceleration operation indicates the time during which the vehicle speed Vn is increased.

If the system vehicle is in the coast operation, then the routine proceeds to step 7100 wherein an acceleration/deceleration value At is set to −2.6 km/h/s. Alternatively, if the system vehicle is in the acceleration operation, then the routine proceeds to step 7090 wherein the acceleration/deceleration value At is set to 2.6 km/h/s.

If the system vehicle is not both in the coast operation and in the acceleration operation meaning that the target preceding vehicle has been selected in step 5000, then a YES answer is obtained in step 7030. The routine then proceeds to step 7040 wherein a basic acceleration/deceleration value is determined in the following manner.

(1) First, an intervehicle distance deviation De is mathematically determined using a distance D to the target preceding vehicle and the target intervehicle distance Dt obtained in step 6050 according to the equation (36) below.

$$De \leftarrow D-Dt \tag{36}$$

Figures 15, 16:
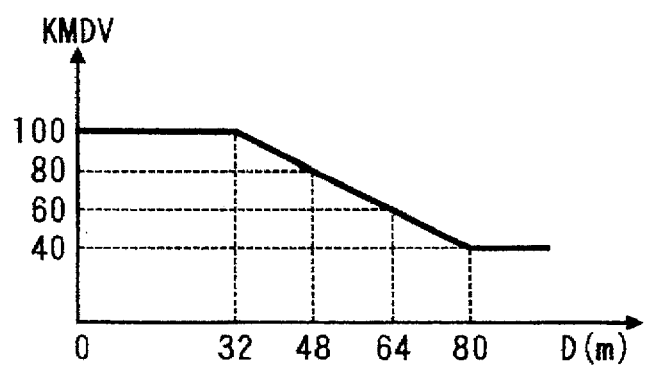
FIG. 15 is a table which shows parameters for determining a basic acceleration/deceleration value MDV in terms of the relation between a intervehicle distance deviation De and a relative speed Vr.
FIG. 16 is a graph which shows the relation between a correction coefficient KMDV and an intervehicle distance D.

(2) Next, the basic acceleration/deceleration value MDV (km/h/s) is determined by interpolating mapped parameters shown in FIG. 15 using the intervehicle distance deviation De and the relative speed Vr. For hysteresis, dead bands of 2 m are provided between adjacent boundaries of the mapped parameters of the intervehicle distance deviation De, while dead bands of 1 km/h are provided between adjacent boundaries of the mapped parameters of the relative speed Vr. If a value of the intervehicle distance deviation De and a value of the relative speed Vr are out of the mapped ranges, a value within the closest range is selected as the basic acceleration/deceleration value MDV.

Note that even if the intervehicle distance deviation De indicates a negative value (−), an acceleration value (i.e., the basic acceleration/deceleration value MDV>0) is selected as long as the speed of the target preceding vehicle is higher than that of the system vehicle (Vr>0) so that the target preceding vehicle is traveling away from the system vehicle. This is because there is no need for decelerating the system vehicle as long as the target preceding vehicle is moving away from the system vehicle.

Subsequently, the routine proceeds to step 7050 wherein a correction coefficient KMDV for the basic acceleration/deceleration value MDV is determined from the relation, as shown in FIG. 16, to the intervehicle distance D for preventing the intervehicle distance control system 2 from responding to a distant preceding vehicle sensitively.

The routine then proceeds to step 7060 wherein the acceleration/deceleration value At is determined by the following equation (37).

$$At \leftarrow MDV \times KMDV/100 \tag{37}$$

If a NO answer is obtained in step 7030, then the routine proceeds to step 7070 wherein it is determined whether five seconds have elapsed or not after completion of the acceleration operation. If a YES answer is obtained, then the routine proceeds to step 7090 wherein the acceleration/deceleration value At is set to 2.6 km/h/s. Alternatively, if a NO answer is obtained in step 7070, then the routine proceeds to step 7080 wherein the acceleration/deceleration value At is set to 1.3 km/h/s.

The reason for setting the acceleration/deceleration value At to 2.6 km/h/s in step 7090 is that the control priority is given to the driver, allowing the driver to accelerate the system vehicle.

Figure 17:
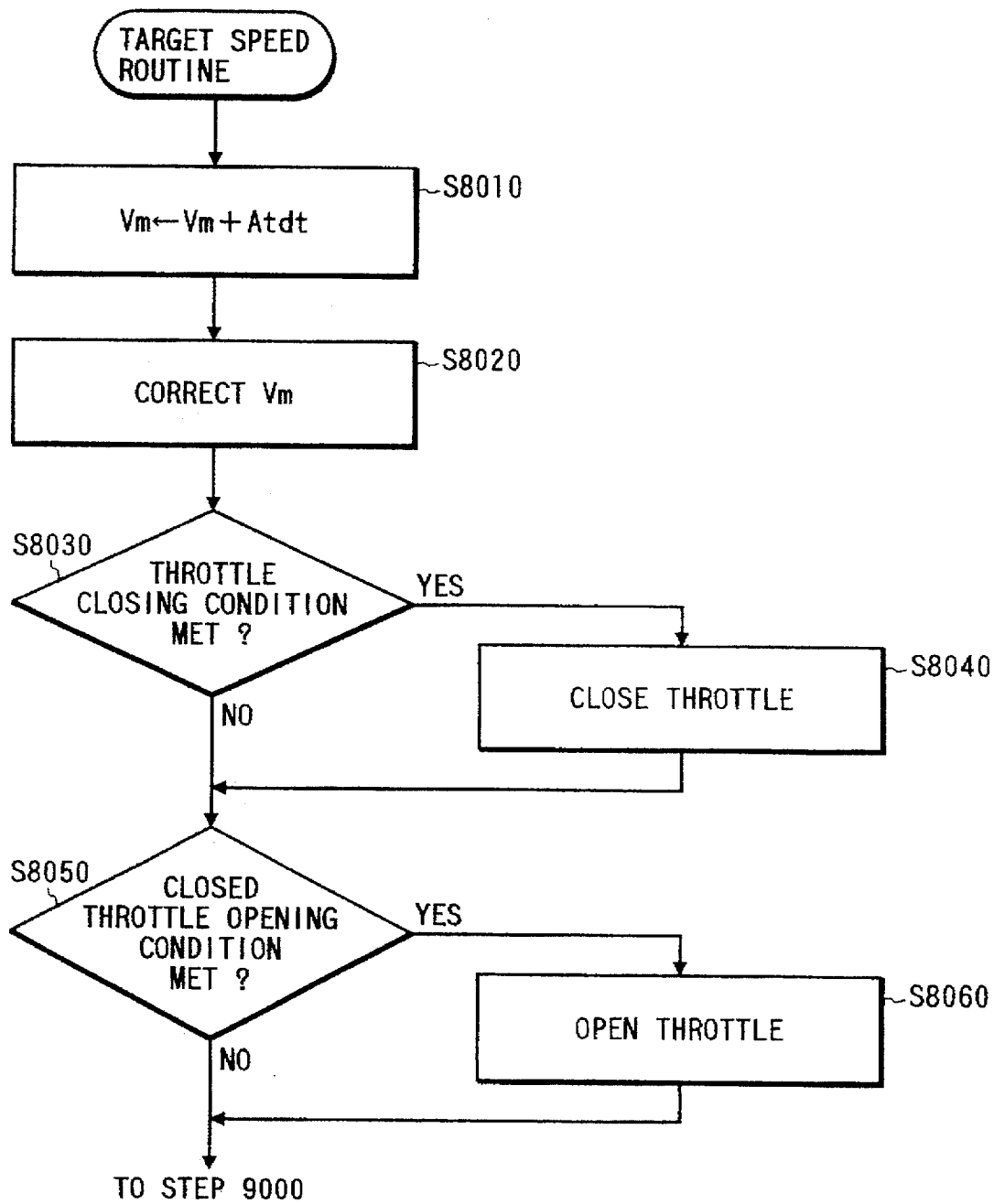
FIG. 17 is a flowchart which shows a target vehicle speed determination routine.

After the acceleration/deceleration value At is determined, the routine proceeds to step 8000 and then enters step 8010 shown in FIG. 17.

In step 8010, the target vehicle speed Vm is determined according to the equation (38) below.

$$Vm \leftarrow Vm + At \times dt \tag{38}$$

where dt represents a processing time interval in step 8010, for example, 0.2 sec.

The routine then proceeds to step 8020 wherein the target vehicle speed Vm obtained in step 8010 is corrected in the following manner.

(1) If Vm>Vn +2 km/h and At<0, then the target vehicle speed Vm is corrected according to the equation (39) below.

$$Vm \leftarrow Vm + 2 \text{ kh/h} \tag{39}$$

(2) If Vm<Vn−2 km/h and At>0, then the target vehicle speed Vm is corrected according to the equation (40) below.

$$Vm \leftarrow Vm - 2 \text{ kh/h} \tag{40}$$

(3) The target vehicle speed Vm corrected by the equation (39) or (40) is further corrected in the following manner.
(a) The target vehicle speed Vm is restricted below a cruise control set speed Vs set by the driver (except where the system vehicle is in the acceleration operation).
(b) The target vehicle speed Vm is corrected so as to meet the relation below.

$$Vn-8 \text{ km/h} \leq Vm \leq Vn+3.5 \text{ km/h} \tag{41}$$

After the target vehicle speed Vm is ultimately determined, the routine proceeds to step 8030 wherein it is determined whether a throttle fury closing condition is satisfied or not. If a NO answer is obtained, then the routine proceeds to step 8040 wherein it is determined whether a fully closed throttle releasing condition is satisfied or not.

The throttle fully closing condition is a condition for starting a deceleration operation to decelerate the system vehicle quickly when the vehicle speed Vn exceeds the target vehicle speed Vm and expressed by the equation (42) below. The fully closed throttle releasing condition is a condition for stopping the deceleration operation and expressed by an equation (43) below.

$$V_m < V_n - 3 \text{ km/h} \quad (42)$$

$$V_m \geq V_n - 2 \text{ km/h} \quad (43)$$

If a YES answer is obtained in step 8030, then the routine proceeds to step 8040 wherein throttle fully closing control is performed. If a YES answer is obtained in step 8050, then the routine proceeds to step 8060 wherein the throttle fully closing control is released. The throttle fully closing control is such that a duty factor of a control signal controlling the speed of an electric motor adjusting an opening degree of the throttle valve of the engine is changed to a maximum duty factor to close the throttle valve at a maximum speed.

After completion of step 8000, the routine proceeds to step 9000 wherein the speed of the system vehicle is maintained at the target vehicle speed Vm under conventional cruise control.

Several modifications of the above intervehicle distance control will be discussed below.

First Modification

While, in step 3200, the neutral steered angle θc is determined based on the detected steered angles and vehicle speed, it may be determined based on movement of a specified stationary object in the following manner for improving the reliability of the neutral steered angle θc.

First, upon detecting a stationary object, loci thereof relative to the system vehicle are monitored at regular time intervals. The loci are then defined as an arc to calculate the curvature R of a road on which the system vehicle is traveling. If an absolute value of the curvature R is more than a given value (e.g., 1500 m), a difference between the neutral steered angle θc and the actual steered angle θ is determined and then cumulated every control cycle. If an absolute value of the cumulative value exceeds a given value and if the cumulative value is positive, a given value is subtracted from the neutral steered angle θc. The given value is preferably set to 1/10 of a resolution of the steering angle sensor 8, for example, 0.225°, if the resolution is 2.25°. Alternatively, if the cumulative value is negative, the given value is added to the neutral steered angle θc.

Figure 18:
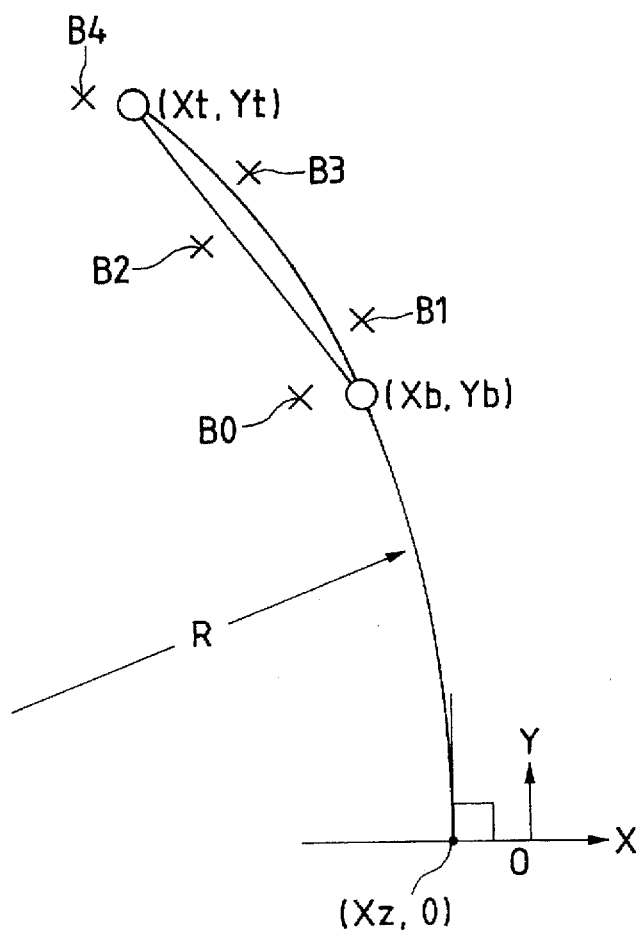
FIG. 18 is an illustration which shows a curvature of a road determined using loci of a stationary object relative to a system vehicle.

The loci of the stationary object may be defined as the arc in the following three steps (1) to (3). In FIG. 18, it is assumed that five loci B0 to B4 of the stationary object relative to the system vehicle are derived at regular time intervals.

Figure 19:
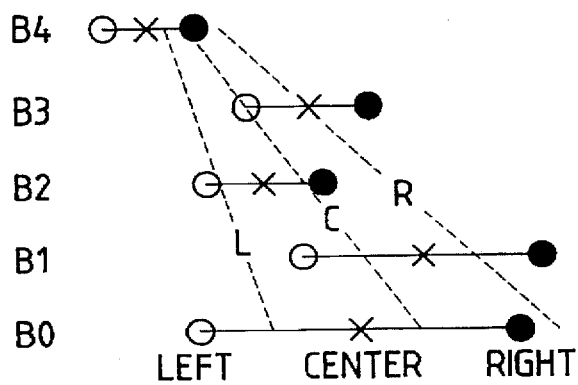
FIG. 19 is an illustration which shows loci of a stationary object relative to a system vehicle for determining a curvature of a road.

(1) Coordinates of five locations which are used in finding the curvature R are determined.
(a) As shown in FIG. 19, coordinates of left ends, centers, and right ends of the five loci B0 to B4 are determined.
(b) Three segments (X=aY+b), as indicated by broken lines L, C, and R in FIG. 19, which extend over the left ends, the centers, and the right ends of the loci B0 to B4, respectively, are defined using the method of least squares.
(c) The square of a difference between the segment L and the left end of each of the loci B0 to B4 is determined. Similarly, the square of a difference between the segment C and the center of each of the loci B0 to B4 is determined. The square of a difference between the segment R and the right end of each of the loci B0 to B4 is also determined. For the left ends, the centers, and the right ends, total values St of the squares are determined, respectively, according to the following equation (44).

$$St \leftarrow \Sigma\{(aY_j + b - X_j) \cdot (aY_j + b - X_j)\} \quad (44)$$

(d) From among the left ends, the centers, and the right ends of the loci B0 to B4, ones (i.e., five locations) representing the smallest of the total values St are selected, and their coordinates are used to determine the curvature R. Note that if x-coordinates of the centers <−2 m, the right ends are selected, while if the x-coordinates of the centers >2 m, the left ends are selected.

(2) Segment approximation of the loci
Coordinates (Xt, Yt) and (Xb, Yb), as shown in FIG. 18, of both ends of one of the segments L, C, and R defined by the five locations obtained in step (1) are determined.

(3) Determination of the curvature R
By solving the following simultaneous equations (45) and (46) using the coordinates (Xt, Yt) and (Xb, Yb), the curvature R is determined.

$$Xt - Xz = Yt \cdot Yt/2R \quad (45)$$

$$Xb - Xz = Yb \cdot Yb/2R \quad (46)$$

An equation of circle is defined by an arc extending through the two points (Xt, Yt) and (Xb, Yb), intersecting at the point (Xz, 0) the x-axis passing through the center of the system vehicle. The equation of circle also approximates a parabola under the condition that $|X| << |Y|$ and $|X| << |R|$.

Figure 20:
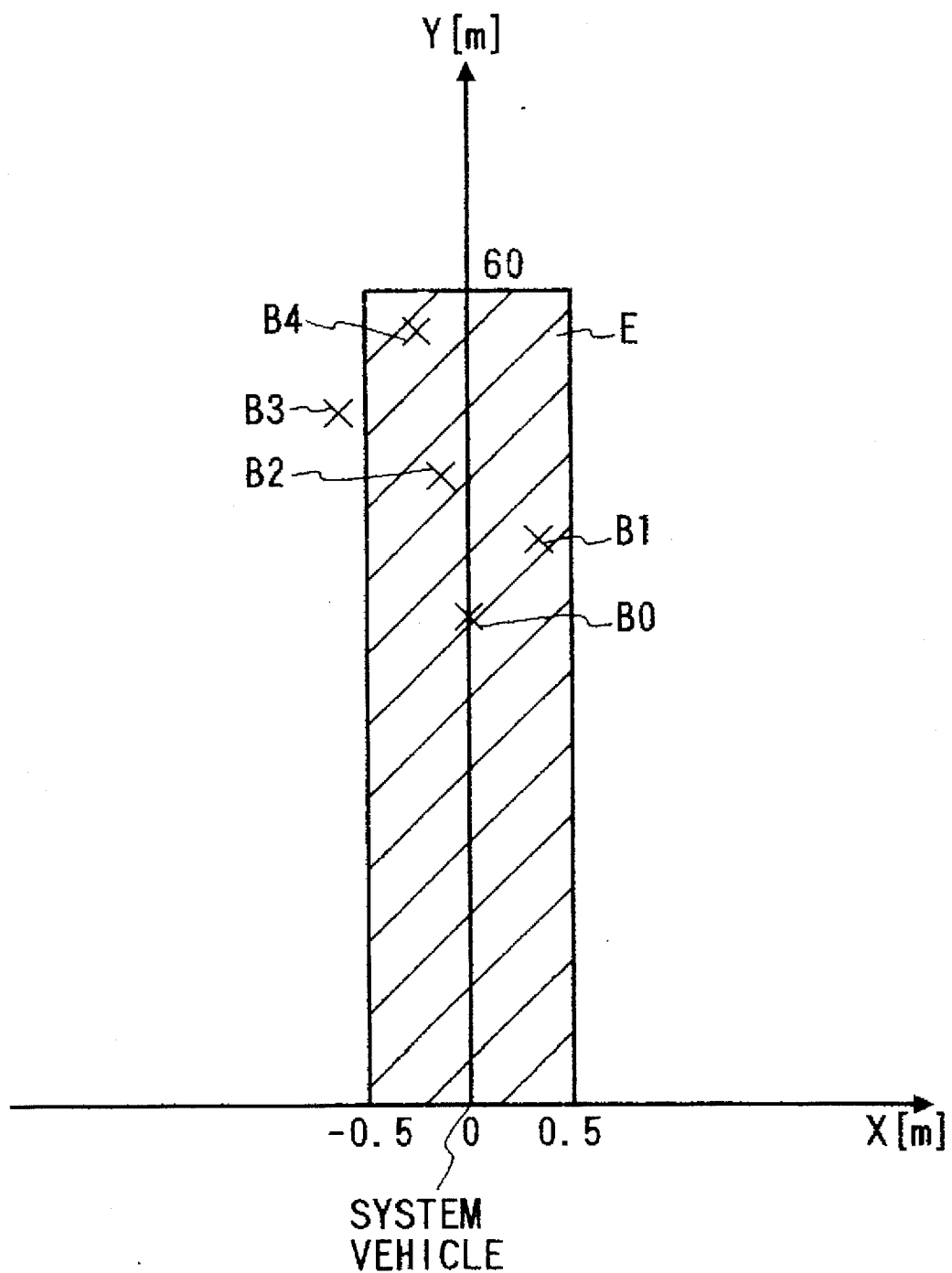
FIG. 20 is an explanatory view for determining a curvature of a road using the loci of the stationary object shown in FIGS. 18 and 19.

However, as shown in FIG. 20, if the loci B0 and B4 both exist within a zone E, then the curvature R is defined as infinity (R=∞) without performing the steps (2) and (3).

Second Modification

The following setting conditions may be added to the setting condition for the leaning prohibiting counter value Cgs in step 3220 for improving the reliability of the neutral steered angle θc obtained in step 3200.

(1) If an object identified as an obstacle (i.e., a stationary object of the object width W different from that of a vehicle) on the side of a road in step 2000 exists immediately in front of the system vehicle and if an absolute value of the curvature R, as determined above based on the loci of the stationary object, is small, it may be determined that the road is curved sharply and that the setting condition for the learning prohibiting counter value Cgs is satisfied. This improves the reliability of the neutral steered angle θc, allowing the target preceding vehicle to be tracked with higher accuracy.

(2) If an object (e.g., a guardrail) is detected in Step 2000 which exists immediately in front of the system vehicle and which has a length extending in a longitudinal direction of the system vehicle, it may be determined that the road is curved sharply and that the setting condition for the learning prohibiting counter value Cgs is satisfied. This further improves the learning of a steered angle while the system vehicle is traveling straight.

Third Modification

In order to achieve a more accurate determination of a preceding vehicle, the instantaneous same lane probability in step 4010 may be determined or corrected in the following steps (1) to (3).

(1) A relative position(s) of a stationary object(s), as identified in step 2000 as an obstacle(s) (e.g., a guardrail) on the side(s) of a road, to the system vehicle or a preceding vehicle is monitored to determine whether a space of a traffic lane exists on either side of the system vehicle or the preceding vehicle or not. For example, if the obstacle exists immediately on the left side of the system vehicle or a preceding vehicle, it is determined that there is no lane on the left side of the system vehicle or the preceding vehicle and that the system vehicle or the preceding vehicle is traveling in the left lane of a road if it has two lanes. Alternatively, if the obstacles exist both sides of the system vehicle or the preceding vehicle, it is determined that the system vehicle or the preceding vehicle is traveling on a road having only one lane.

(2) A variation in steered angle and activation of a turn indicator of the system vehicle are monitored to determine whether the system vehicle is veering to an adjacent lane.

(3) The analyses of the above steps (1) and (2) are used in determining the instantaneous same lane probability. For example, since a moving object having the object width W equal to that of a vehicle, tracked by the distance sensor 6 while the system vehicle is traveling on a road having only one lane will be a preceding vehicle moving on the same lane as the system vehicle, the instantaneous same lane probability is increased.

Fourth Modification

When a turn indicator is turned on, the center of determination of the target preceding vehicle may be shifted to a direction indicated by the turn indicator according to the speed of the system vehicle. For example, while in step 4010, the central positions (X0, Y0) and the object widths (W0) of all objects obtained in step 2000 are converted into parameters (X, Y, W) in terms of a straight road, respectively, and then plotted on the same lane probability map shown in FIG. 11 to determine the instantaneous same lane probability of each object, the curvature R used in the equation (17) may be increased when the turn indicator indicates the right direction and decreased when the turn indicator indicates the left direction. This prevents the system vehicle from being decelerated undesirably when it shifts to a right adjacent lane and passes a preceding vehicle because the speed of the preceding vehicle is too slow. Further, if another vehicle exists in the adjacent lane to which the system vehicle is veering, it can be identified as a preceding vehicle quickly.

Fifth Modification

The curvature R determined using the loci of the object obtained in step 2000 and an object collision determination may be considered in determining the instantaneous same lane probabilities determined in step 4010. Specifically, if the object will collide with the system vehicle, the instantaneous same lane probability thereof is increased. If the object will not collide with the system vehicle, the instantaneous same lane probability is maintained as is or decreased. If the curvature R has been determined based on the loci of the object, it is used in the equation (17) or used in correcting the curvature R determined based on a steered angle. This eliminates an error in determining the curvature R caused by the swing of the steering wheel.

Sixth Modification

Figure 21:
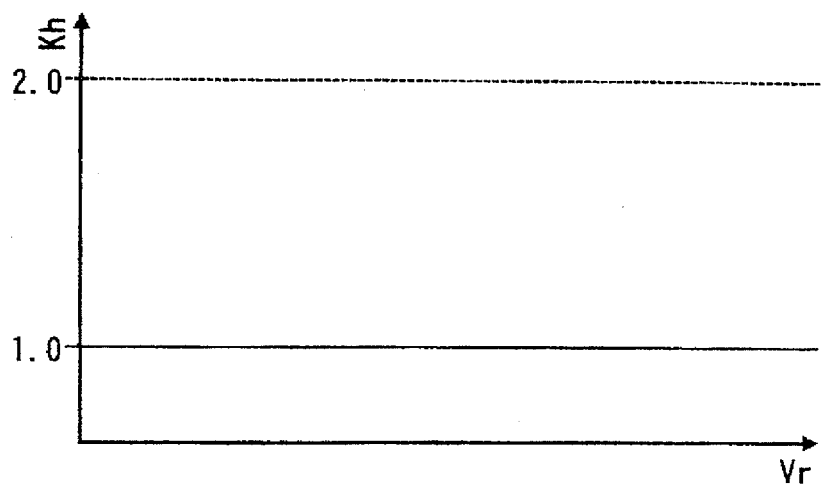
FIG. 21 is a graph which shows the relation between a correction value Kh for correcting an instantaneous same lane probability P0 and a relative speed Vr of an object.

If it has been determined that a tracked object is approaching the system vehicle based on the relative speed Vr thereof determined in step 2000, the instantaneous same lane probability P0 of that object determined in step 4010 may be increased. For example, using a correction value Kh, as shown in FIG. 21, which increases as the relative speed Vr of a tracked object is changed in a direction close to the system vehicle, the instantaneous same lane probability P0 of that object is corrected according to the following equation (47). Note that an upper limit of the instantaneous same lane probability is 100%.

$$P0 \leftarrow P0 \times Kh \qquad (47)$$

This achieves more accuracy anti-collision action to prevent the system vehicle from colliding with a preceding vehicle traveling at a speed slower than that of the system vehicle.

Seventh Modification

If an object detected in step 2000 is small, it may be presumed to be a vehicle such as a motorcycle. Since a motorcycle usually travels on either side of a road, the instantaneous same lane probability of the motorcycle may be increased for safety. For example, if the following conditions are all satisfied, it is determined that a small object such as a motorcycle is traveling in front of the system vehicle, and several tens percent (e.g., about 30%) is added to the instantaneous same lane probability P0 of the motorcycle.

(a) The object is tracked for a given period of time (e.g., 5 sec.).

(d) The object width W is smaller than a given value. For example, an average width of the object during a time the object is tracked is smaller than 0.7 m.

(c) A y-coordinate of the center of the object is less than a given value (e.g., 50 m).

(d) An x-coordinate X determined by the equation (17), that is, an interval from the y-axis, as shown in FIG. 11, representing the center of a lane in which the system vehicle is traveling, is less than a given value (e.g., 2 m).

Eighth Modification

If the relative speed of a tracked object in a width-wise direction is great, the instantaneous same lane probability P0 determined by the equation (31) or (32) may be restricted from being changed. For example, this is accomplished by increasing the degree to which the instantaneous same lane probability P0 is weighted to decrease a following level of the same lane probability P to the instantaneous same lane probability P0 (i.e., a time constant may be increased).

The detection of a curve only based on outputs from the steered angle sensor 8 may cause the same lane probability P of a preceding vehicle to be small, resulting in error in determining the preceding vehicle as a vehicle traveling ahead of the system vehicle when the system vehicle is traveling straight and the preceding vehicle traveling in the same lane as the system vehicle enters the curve. Accordingly, it is advisable that such a condition be detected based on the magnitude of a relative speed Vrx in a width-wise direction (i.e., a direction of the x-axis) to increase the time constant of the instantaneous same lane probability, as discussed above. When the system vehicle enters the curve following the preceding vehicle, the relative speed Vrx in the width-wise direction is decreased. Thus, the time constant is returned to its initial value. The time constant is, however, not increased when the preceding vehicle is in close proximity to the system vehicle (e.g., within 40 m) for quickly responding to another vehicle pulling in front of the system vehicle. This prevents a preceding vehicle from being lost and another vehicle traveling in an adjacent lane from being identified as a target preceding vehicle, which would be caused by a decrease in the instantaneous same lane probability at the entrance to the curve.

For example, the time constant is preferably increased when an absolute value of the relative speed Vrx in the width-wise direction determined according to the following equation (48), is great.

$$Vrx \leftarrow dX/dt - d(Y \cdot Y/2R)/dt \qquad (48)$$

where dX /dt indicates an x-component of the relative speed Vr of the preceding vehicle and d(Y·Y/2R)/dt indicates an x-component of a change rate of the center of the lane in which the system vehicle is traveling.

Ninth Modification

If another vehicle nips in between the system vehicle and a preceding vehicle being tracked, the cruise control may be performed regardless of the same lane probability P of the tracked preceding vehicle. The nipping of the vehicle is detected by monitoring movement thereof in a width-wise direction. Thus, it is possible to determine the vehicle which has nipped in front of the system vehicle as a target preceding vehicle quickly before the same lane probability thereof becomes great. This allows the cruise control to be performed quickly.

Tenth Modification

A navigation system using a GPS (Global Positioning System) may be incorporated in the intervehicle distance control system 2. Using map information of the navigation system derived based on current positional data of the system vehicle from the GPS, it is possible to determine whether a curve exists in a forward direction of the system vehicle or not. If the curve exists in the forward direction, distant objects located at a given distance away from the system vehicle may not be determined as preceding vehicles. This determination is preferably made before or after step 5030 in FIG. 12. This prevents the instantaneous same lane probability P0 from being increased to perform the intervehicle distance control undesirably, which is caused by the fact that a vehicle traveling in an adjacent lane on a curved road ahead of the system vehicle traveling straight is detected as existing substantially in front of the system vehicle.

Eleventh Modification

In steps 6030, 6040, and 6060 to 6110 of the target intervehicle distance determination process, the target intervehicle distance Dt is, as already discussed, determined by a driver's manual operation of the tap switch 12e. The manual operation of the tap switch 12e is usually performed when the initial value T0 of the target intervehicle distance time TH set in step 6020 is of no interest to the driver, but it is quite troublesome because the operation of the tap switch 12e must be performed at least one time before the intervehicle distance control is initiated.

Figure 22:
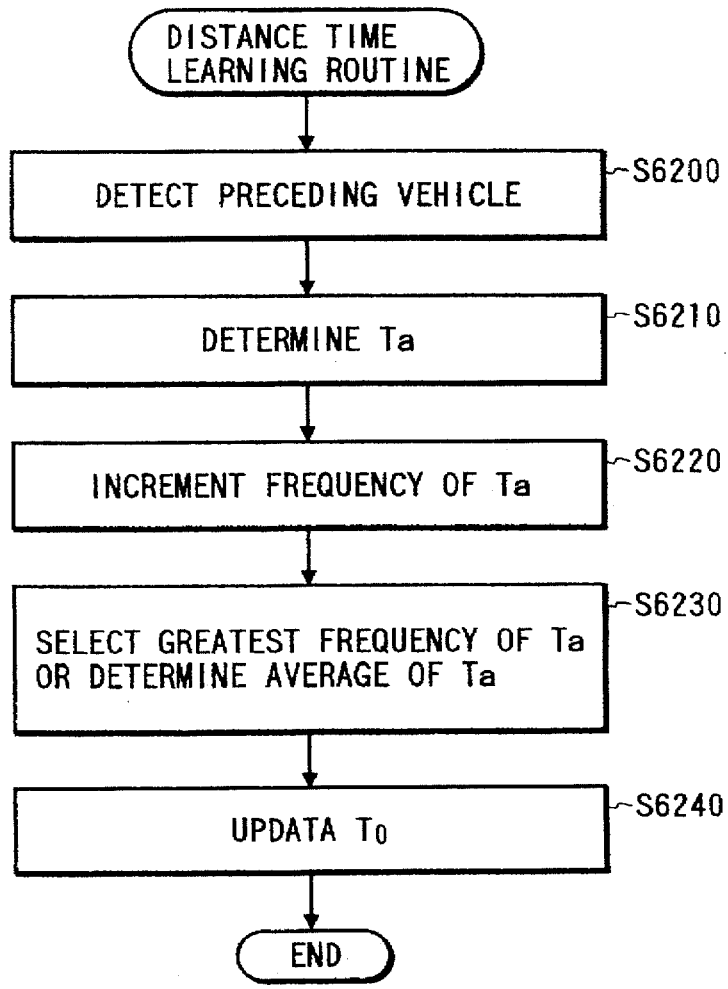
FIG. 22 is a flowchart which shows an intervehicle distance learning routine used in a modification of intervehicle distance control.

For avoiding the above drawback, a program, as shown in a flowchart of FIG. 22, may be carried out in stead of steps 6020, 6040, and 6060 to 6110 or in addition to these steps to learn an intervehicle distance of interest to the driver when the intervehicle distance control is not performed.

After executing step 6200 wherein a target preceding vehicle is determined in the same manner as that performed in steps 1000 to 5000, the routine proceeds to step 6210 wherein an intervehicle distance between the system vehicle and the target preceding vehicle is determined using positional coordinates of the target preceding vehicle obtained in step 2000 and then divided by the speed of the system vehicle to find an intervehicle distance time Ta. The routine then proceeds to step 6220 wherein a frequency of the intervehicle distance time Ta obtained in this control cycle which is stored in one of memory locations of a memory in the control unit 4 is incremented for defining a frequency distribution of the intervehicle distance time Ta.

The routine then proceeds to step 6230 wherein the intervehicle distance time Ta showing the greatest frequency is selected or an average value is determined by weighting the intervehicle distance times Ta with the frequencies thereof. The routine then proceeds to step 6240 wherein the value determined in step 6230 is set as the initial value T0 which is used in step 6020 upon initiation of the intervehicle distance control operation. This minimizes the need for the driver to operate the tap switch 12e.

Frequency distributions of the intervehicle-distance time Ta may be determined for every vehicle speed. Vn in step 6220. The intervehicle distance time Ta showing the greatest frequency in one of the frequency distributions corresponding to the vehicle speed Vn in this control cycle or an average value determined in a similar manner to that discussed above is set to the initial value T0 in step 6020.

Twelfth Modification

Upon initiation of the intervehicle distance control, the target intervehicle distance Dt (or the target intervehicle distance time TH) may be increased for a given period of time according to the distance to the target preceding vehicle when tracked in step 2000 for avoiding close proximity to the target preceding vehicle if the detection of the target preceding vehicle is delayed undesirably.

For example, the target intervehicle distance time TH may be increased before step 6050. Alternatively, in or after step 6050, the target intervehicle distance Dt may be increased.

Thirteenth Modification

Usually, when a plurality of vehicles (e.g., 3 or 4 vehicles) exist ahead of the system vehicle, they may be considered as being traveling in a group. Thus, the target intervehicle distance Dt may be decreased in the following manner.

In, before, or after step 6050, an average value of the number of traveling vehicles being tracked for several seconds (e.g., 3 sec.) is determined based on data in step 2000. If the average value is more than three, the target intervehicle distance time TH (or the target intervehicle distance Dr) is shortened using a correction coefficient Kd (0<Kd<1) according to the following equation (49).

$$TH \rightarrow Tmn + (TH - Tmn) \times Kd \qquad (49)$$

where Tmn is a minimum intervehicle distance time, for example, 0.7 sec.

This realizes the fact that ordinary drivers bring their vehicles close to preceding vehicles intentionally when they travel on a congested road.

Fourteenth Modification

When preceding vehicles are unidentified, the acceleration/deceleration value At is, as explained above, set to a constant positive value (i.e., an acceleration value) in step 7080, but it may alternatively be limited to a safe value based on the steered angle θ0, a lateral acceleration G, or a traveling road radius for decreasing the vehicle speed Vn to within a safe range.

Fifteenth Modification

When step 7080 is first performed after a NO answer is obtained in step 7070, the acceleration/deceleration value At (i.e., 1.3 km/h/s) may be increased gradually for preventing the driver from feeling uncomfortable.

Sixteenth Modification

The acceleration/deceleration value At may be decreased when the turn indicator indicates the direction of a traveling lane (i.e., a normal speed lane). This is because a lane change from a passing lane to a traveling lane is usually considered as a lane change from a faster traffic flow to a slower traffic flow. This also decreases the degree of acceleration when the system vehicle enters a parking area from the traveling lane.

Seventh Modification

When the turn indicator indicates a direction to a passing lane while the system vehicle is traveling on a traveling lane, the acceleration/deceleration value At may be increased in step 7080. This is due to the fact that a lane change from the traveling lane to the passing lane is usually considered as a lane change to a faster traffic flow.

Eighteenth Modification

In stead of the map shown in FIG. 15, a plurality of maps may be used according to the length of the target intervehicle distance Dt. For example, when the target intervehicle distance Dt is relatively longer, a map for maintaining the vehicle speed constant, for example, a map providing a constant value of the basic acceleration/deceleration value MDV regardless of a difference between the intervehicle distance deviation De and the relative speed Vr, is used, while when the target intervehicle distance Dt is relatively shorter, a map for maintaining the intervehicle distance constant, for example, a map changing the basic acceleration/deceleration value MDV greatly according to a difference between the intervehicle distance deviation De and the relative speed Vr, is used. This establishes a good drive feeling.

Nineteenth Modification

In stead of the map shown in FIG. 15, a plurality of maps may be used according to the degree of the vehicle speed Vn. For example, when the vehicle speed Vn is relatively low, a map for increasing a control response rate, for example, a map changing the basic acceleration/deceleration value MDV greatly according to a difference between the intervehicle distance deviation De and the relative speed Vr, is used, while when the vehicle speed Vn is relatively high, a map for decreasing the control response rate, for example, a map providing substantially a constant value of the basic acceleration/deceleration value MDV regardless of a difference between the intervehicle distance deviation De and the relative speed Vr, is used. This also establishes a good drive feeling.

Twentieth Modification

The acceleration/deceleration value At may be decreased if the system vehicle is determined as being traveling on a downhill road. Specifically, during a time when the system vehicle is traveling on the downhill road, if the acceleration/deceleration value At indicates a positive value (i.e., an acceleration), it is decreased, while if the acceleration/deceleration value At indicates a negative value (i.e., a deceleration), it is increased. For example, it may be determined that the system vehicle is traveling on the downhill road if a determination that the throttle valve is closed to a given extent is made by comparing the relation between the vehicle speed Vn and the opening degree of the throttle valve detected by the throttle valve position sensor 20b with the relation therebetween when the system vehicle travels on a level road. If it is determined that the system vehicle is traveling on the downhill road, the acceleration/deceleration value At is changed to a smaller value after step 7040. This avoids overspeed of the system vehicle during traveling on the downhill road.

Twenty-first Modification

The acceleration/deceleration value At may be corrected based on the same lane probability P of the target preceding vehicle after step 7040. For example, an absolute value of the acceleration/deceleration value At is decreased as the same lane probability P is lowered. This minimizes an error in tracking a vehicle traveling in an adjacent lane. It is, however, advisable that when the relative speed Vr is negative, the correction not be performed for avoiding the collision with a preceding vehicle approaching the system vehicle.

Twenty-second Modification

An absolute value of the acceleration/deceleration value Ta may be decreased after step 7040 when the target intervehicle distance Dt is longer than a given distance. This is because usually, a distant vehicle is not felt to be dangerous and also does not induce the driver to track it.

Twenty-third Modification

Once the throttle valve is fully closed, the system vehicle may be prohibited from accelerating until the following relation (50) between the actual intervehicle distance D and the target intervehicle distance Dt is met.

$$D \geq Dt + a \qquad (50)$$

where a is a given positive value.

This minimizes the number of throttle valve fully closing operations generating uncomfortable mechanical shocks.

The equation (50) may alternatively be expressed in terms of an intervehicle distance time.

Twenty-fourth Modification

If a preceding vehicle tracked by the distance sensor 6 is determined as an unidentified object, the target vehicle speed Vm may be set to a current vehicle speed or the vehicle speed Vn.

While in step 8010, the target vehicle speed Vm is decreased to decrease the speed of the system vehicle if the preceding vehicle is slower than the system vehicle, in step 7080, the decreased target vehicle speed Vm is increased gradually if the preceding vehicle disappears out of the forward detectable zone during a time when the target vehicle speed Vm is lower than the vehicle speed Vn. This consumes a longer time until the system vehicle is accelerated. Therefore, a control response rate is improved by setting the target vehicle speed Vm to a current vehicle speed or the vehicle speed Vn if a preceding vehicle is determined as an unidentified object. Note that $Vm \leq Vs$ that is a cruise control set speed.

Twenty-fifth Modification

If it is possible that the system vehicle is in close proximity to a preceding vehicle, causing an accidental collision, the current intervehicle distance indicator 14b of the indicator unit 14 or a buzzer (not shown) may be used to alert the driver to the possibility of collision in step 1000 or 2000.

Twenty-sixth Modification

When the system vehicle is decelerated quickly under the Intervehicle distance control, a brake lamp (not shown) may be turned on to inform a trailing vehicle that the system vehicle is being decelerated for avoiding a rear-end collision with the trailing vehicle.

Twenty-seventh Modification

If it is in bad weather conditions, the intervehicle distance control may be prohibited.

Usually, the rain, snow, and fog lower the performance of the distance sensor 6, thereby making it difficult to detect preceding vehicles. It is, therefore, advisable that a weather sensor be provided in the intervehicle distance control system 2 to monitor weather conditions for prohibiting the intervehicle distance control until the weather is improved. As the weather sensor, a sensor which optically detects the amount of particles floating in the air or a sensor which detects drops of water based on a change in conductivity may be used. It is also advisable that the driver be Informed of the prohibition of the intervehicle distance control through the Indicator unit 14.

Twenty-eighth Modification

When a target preceding vehicle is selected out of objects tracked by the distance sensor 6 to switch a control mode from the cruise control to the intervehicle distance control, a lamp (not shown) mounted in the indicator unit 14 or the current intervehicle distance indicator 14b may be turned on and off to inform the driver of the change of the control mode. Alternatively, it is advisable that the color of back light of a display of the indicator unit 14 be changed upon switching of the control mode between the cruise control and the intervehicle distance control. This is because it is difficult for the driver to determine the timing of depressing the brake pedal if the driver does not know whether a target preceding vehicle is tracked by the intervehicle distance control system 2 in steps 1000 to 5000 to have the system vehicle undergo the intervehicle distance control or not. If the driver can perceive through the indicator unit 14 that the intervehicle distance control is not performed when a vehicle is traveling ahead of the system vehicle, it becomes possible for the driver to apply brakes with suitable timing for extra safety.

Twenty-ninth Modification

Even if the driver depresses the brake pedal when the speed of the system vehicle is higher than that of a target preceding vehicle, the system vehicle may be prohibited from accelerating without canceling the intervehicle distance control.

The conventional intervehicle distance control as well as the cruise control is canceled necessarily upon depression of the brake pedal. Resuming the control requires an manual operation of a resuming lever, which is quite inconvenience for the driver. The above control eliminates the need for the manual operation of the resuming lever to relieve driver's loads.

Thirtieth Modification

In the throttle fully closing operation (step 8040) and the fully closed throttle releasing operation (step 8060), the throttle valve may be opened and closed at slow speeds for minimizing uncomfortable mechanical shocks.

Thirty-first Modification

The automatic transmission controller 16 may be designed to perform the function of releasing an overdrive mode of an automatic transmission when a given condition is encountered. In this case, it is advisable that the throttle valve be controlled temporarily in a valve opening direction during the release of the overdrive mode for minimizing an uncomfortable mechanical shock which is usually generated upon a gear change in the automatic transmission.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling an intervehicle distance between a system vehicle equipped with the system and a preceding vehicle present ahead of the system vehicle comprising:

speed measuring means for measuring a speed of the system vehicle;

beam scanning means for scanning a beam over a given scanning angle in a width-wise direction of the system vehicle and receiving beams reflected from objects present within a forward detection zone defined by the scanning angle to detect the objects;

distance and angular position determining means for determining distances to and angular positions of the objects in the forward detection zone based on the reflected beams:

relative position and speed determining means for determining relative positions and relative speeds of the objects to the system vehicle based on the distances and the angular positions of the objects determined by said distance and angular position determining means;

curve determining means for determining a degree of a curve in a road on which the system vehicle is traveling;

same lane probability determining means for determining same lane probabilities of the objects being present in the same traffic lane as the system vehicle based on the degree of the curve determined by said curve determining means and the relative positions of the objects determined by said relative position and speed determining means;

target preceding vehicle selecting means for selecting a target preceding vehicle out of the objects in the forward detection zone based on the same lane probabilities determined by said same lane probability determining means; and intervehicle distance control means for controlling an intervehicle distance between the system vehicle and the target preceding vehicle selected by said target preceding vehicle selecting means, said intervehicle distance means controlling the speed of the system vehicle measured by said speed measuring means to control the intervehicle distance.

2. A system as set forth in claim 1, wherein said curve determining means includes:

steered angle detecting means for detecting a steered angle of the system vehicle at given control cycles;

average steered angle determining means for determining an average steered angle at the given control cycles based on the steered angle detected by said steered angle detecting means, said average steered angle determining means updating the average steered angle based on the average steered angle determined one control cycle earlier and the steered angle detected by said steered detecting means at a current control cycle;

straight travel determining means for determining whether the system vehicle is traveling straight or not based on a variation in the steered angle detected by said steered angle detecting means;

neutral steered angle learning means for learning the steered angles of the system vehicle detected by said steered angle detecting means at given learning cycles when said straight travel determining means determines that the system vehicle is traveling straight to determine a neutral steered angle; and curve degree determining means for determining the degree of the curve of the road based on a deviation between the neutral steered angle determined by said neutral steered angle learning means and the average steered angle determined by said average steered angle determining means.

3. A system as set forth in claim 2, wherein said average steered angle determining means carries out a weighted averaging operation on the average steered angle determined one control cycle earlier and the steered angle detected by said steered angle at a current control cycle to update the average steered angle when the speed of the system vehicle measured by said speed measuring means is greater than a given speed, while the steered angle detected at the current control cycle is defined as the average steered angle when the speed of the system vehicle is smaller than the given speed.

4. A system as set forth in claim 3, further comprising steered angle stability determining means for determining whether the steered angle detected by said steered angle detecting means is stable or not, and wherein when the speed of the system vehicle measured by said speed measuring means is greater than the given speed and said steered angle stability determining means determines that the steered angle is stable, said average steered angle determining means adds in the weighted averaging operation a greater weight to the steered angle detected at the current control cycle, and when the speed of the system vehicle is greater than the given speed and said steered angle stability determining means determines that the steered angle is unstable, said average steered angle determining means adds a smaller weight to the steered angle detected at the current control cycle.

5. A system as set forth in claim 4, further comprising steered angle variation determining means for determining whether a variation in the steered angle detected by said steered angle detecting means is greater than a given value or not, and wherein when the speed of the system vehicle measured by said speed measuring means is greater than the given speed, said steered angle stability determining means determines that the steered angle is stable for a given period of time after said steered angle variation determining means determines that the variation in the steered angle is greater than the given value, while said steered angle stability determining means determines that the steered angle is unstable during a time out of the given period of time.

6. A system as set forth in claim 5, wherein further comprising variation check steered angle determining means for determining a variation check steered angle that is a given parameter for determining the variation in the steered angle detected by said steered angle detecting means, sad variation check steered angle determining means updating the variation check steered angle at the control cycles by carrying out a weighted averaging operation on the variation check steered angle one control cycle earlier and the variation check steered angle at a current control cycle, and wherein said steered angle variation determining means determines that the variation in the steered angle detected by said steered angle detecting means is greater than the given value when a difference between the variation check steered angle and the steered angle detected by said steered angle detecting means is greater than a given value.

7. A system as set forth in claim 6, wherein when the speed of the system vehicle measured by said speed measuring means is greater than the given speed and said steered angle stability determining means determines that the steered angle is stable, said variation check steered angle determining means adds in the weighted averaging operation a smaller weight to the steered angle detected at the current control cycle, when the speed of the system vehicle is greater than the given speed and said steered angle stability determining means determines that the steered angle is unstable, said variation check steered angle determining means adds a greater weight to the steered angle detected at the current control cycle, and when the speed of the system vehicle is smaller than the given speed, said variation check steered angle determining means adds an intermediate weight between the greater weight and the smaller weight to the steered angle detected at the current control cycle.

8. A system as set forth in claim 6, further comprising learning allowing means for allowing said neutral steered angle leaning means to learn the steered angles of the system vehicle detected by said steered angle detecting means to determine the neutral steered angle a give period of time after said steered angle variation determining means determines that the variation in the steered angle detected by said steered angle detecting means is greater than the given value when the speed of the system vehicle measured by said speed measuring means is greater than a preselected speed and the difference between the variation check steered angle determined by said variation check steered angle determining means and the steered angle detected by said steered angle detecting means is smaller than the given value.

9. A system as set forth in claim 2, wherein said neutral steered angle learning means determines a neutral position leaning angle to determine the neutral steered angle based on the steered angle detected by said steered angle detecting means when said straight travel determining means determines that the system vehicle is traveling straight, and updates the neutral position learning angle at the control cycles by carrying out a weighted averaging operation on the neutral position leaning angle determined one control cycle earlier and the steered angle detected at a current control cycle, and wherein a weight added to the neutral position learning angle in the weighted averaging operation is increased every control cycle.

10. A system as set forth in claim 9, wherein the degree to which the weight added to the neutral position learning angle is increased every control cycle is increased according to an increase in the speed of the system vehicle measured by sad speed measuring means.

11. A system as set forth in claim 2, wherein said curve degree determining means determines the degree of the curve of the road based on a deviation between the neutral steered angle determined by said neutral steered angle learning means and the average steered angle determined by said average steered angle determining means when a first condition where the speed of the system vehicle measured by said speed measuring means is greater than a predetermined speed and a given number of the learning cycles expire is encountered, and wherein the deviation between the neutral steered angle and the average steered angle is decreased when a second condition different from the first condition is encountered.

12. A system as set forth in claim 1, wherein said same lane probability determining means includes:

a same lane probability distribution map representing a probability that an object present ahead of the system vehicle exist in the same traffic lane on a straight road as that in which the system vehicle is traveling based on a relative position of the object to the system vehicle;

relative position converting means for converting the relative positions of the objects determined by said relative position and speed determining means into relative positions of the objects to the system vehicle if the objects exit on the straight road based on the degree of the curve determined by said curve determining means; and instantaneous same lane probability determining means for determining instantaneous probabilities that the objects detected by said beam scanning means exist in the same traffic lane as the system vehicle by look-up using said same lane probability distribution map based on the relative positions converted by said relative position converting means, and wherein said same lane probability determining means determines the same lane probabilities of the objects based on the instantaneous probabilities.

13. A system as set forth in claim 12, wherein said same lane probability determining means updates the same lane probabilities of the objects at the control cycles using a weighted averaging operation on the same lane probabilities determined one control cycle earlier and the instantaneous same lane probabilities, respectively.

14. A system as set forth in claim 13, wherein when the instantaneous same lane probabilities are greater than a given value, a weight added to the instantaneous same lane probabilities in the weighted averaging operation is increased.

15. A system as set forth in claim 13, wherein when one of the objects detected by said beam scanning means is a stationary object, said same lane probability determining means provides a given upper limit to the same lane probability of the one of the objects.

16. A system vehicle as set forth in claim 12, wherein said same lane probability distribution map indicates a lower probability distribution lowered by a given probability and a higher probability distribution higher than the given probability, the lower probability distribution spreading in a forward direction from the system vehicle and indicating a probability which is decreased in a lateral direction perpendicular to a traveling direction of the system vehicle, the higher probability distribution narrowing in the forward direction and being converged at a given distance away from the system vehicle.

17. A system as set forth in claim 16, wherein the lower probability distribution is defined by first and second curved boundary lines extending in the forward direction from the system vehicle.

18. A system as set forth in claim 16, wherein said lower probability distribution is defined by first and second curved boundary lines spreading in the forward direction from the system vehicle in proportion to the square of a distance away from the system vehicle in the forward direction.

19. A system as set forth in claim 16, wherein said higher probability distribution is defined by first and second curved lines expanding in the lateral direction.

20. A system as set forth in claim 16, wherein the higher probability distribution is defined by first and second straight lines intersecting at the given distance away from the system vehicle.

21. A system as set forth in claim 1, wherein said relative position and speed determining means determines whether the objects detected by said beam scanning means are moving object or stationary objects based on the relative speeds of the objects and the speed of the system vehicle, and wherein said target preceding vehicle selecting means includes:

target moving preceding vehicle selecting means for selecting from among the same lane probabilities greater than a first probability the greatest one as a reference probability, selecting from among the moving objects showing the same lane probabilities within a given range over the reference probability and the moving objects showing the same lane probabilities greater than a second probability one of the smallest distance between itself and the system vehicle as a target moving preceding vehicle, and determining that there is no target moving preceding vehicle if the reference probability is not selected;

target stationary preceding vehicle selecting means for selecting from among the stationary objects showing the same lane probabilities greater than a third probability one of the smallest distance between itself and the system vehicle as a target stationary preceding vehicle and determining that there is no target stationary preceding vehicle if there is no stationary objects showing the same lane probabilities greater than the third probability; and target preceding vehicle determining means for determining as the target preceding vehicle either of the target moving preceding vehicle and the target stationary preceding vehicle which has the smaller of the distances to the system vehicle, if either of the target moving preceding vehicle and the target stationary preceding vehicle is selected, the selected one being determined as the target preceding vehicle, if both the target moving preceding vehicle and the target stationary preceding vehicle are not selected, the target preceding vehicle determining means determining that there is no target preceding vehicle.

22. A system as set forth in claim 21, wherein the first probability is changed according to the degree of the curve determined by said curve determining means.

23. A system as set forth in claim 1, wherein said intervehicle distance control means includes:

target intervehicle distance determining means for determining a target intervehicle distance to the target preceding vehicle based on an input from a system operator;

target change rate of speed determining means for determining a target change rate of the speed of the system vehicle based on the relative speed of the target preceding vehicle and a difference between the distance to the target preceding vehicle determined by said distance and angular position determining means and the target intervehicle distance;

target vehicle speed determining means for determining a target vehicle speed and updating the target vehicle speed at given control cycles based on the target vehicle speed determined one control cycle earlier and the target change rate determined by said target change rate; and speed control means for controlling the speed of the system vehicle to agree with the target vehicle speed.

24. A system as set forth in claim 23, wherein said target intervehicle distance determining means determines a target intervehicle distance time which includes a variable and a given initial value, the variable being changed based on an input from a system operator, the target intervehicle distance being determined by multiplying the target intervehicle distance time by the speed of the system vehicle measured by said speed measuring means.

25. A system as set forth in claim 24, wherein the target intervehicle distance is defined within a range from given upper to lower limit.

26. A system as set forth in claim 23, wherein said target vehicle speed determining means increases a response rate of the target vehicle speed is increased when the relative speed of the target preceding vehicle determined by said relative position and speed determining means is changed from an acceleration to a deceleration and vice versa.

27. A system as set forth in claim 23, wherein when a system operator does not accelerate or decelerate the system vehicle, said target vehicle speed determining means limits the target vehicle speed within a range including the speed of the system vehicle measured by said speed measuring means below a set vehicle speed set under cruise control performed when intervehicle distance control by said intervehicle distance control means is not performed.

28. A system as set forth in claim 23, wherein when said target preceding vehicle selecting means determines that there is no target preceding vehicle and when the speed of the system vehicle measured by said speed measuring means is greater than the target vehicle speed, said target vehicle speed determining means sets the target vehicle speed to the speed of the system vehicle and then updates the target vehicle speed based on the target vehicle speed determined one control cycle earlier and the target change rate determined by said target change rate, when said target preceding vehicle selecting means determines that there is no target preceding vehicle and when the speed of the system vehicle measured by said speed measuring means is smaller than the target vehicle speed, said target vehicle speed determining means determining the target vehicle speed based on an initial value indicating the target vehicle speed and updating the target vehicle speed based on the target vehicle speed determined one control cycle earlier and the target change rate determined by said target change rate, and wherein the target vehicle speed is limited within a range below a set vehicle speed set under cruise control performed when intervehicle distance control by said intervehicle distance control means is not performed.

29. A system as set forth in claim 9, wherein said relative position and speed determining means determines whether the objects detected by said beam scanning means are moving object or stationary objects based on the relative speeds of the objects and the speed of the system vehicle, and further comprising stationary object locus monitoring means for monitoring loci of one of the stationary objects determined by said relative position and speed determining means relative to the system vehicle at given time intervals, and wherein said curve degree determining means determines the degree of the curve based on the loci monitored by said stationary object locus monitoring means, and further comprising cumulating means for cumulating a difference between the neutral position learning angle and the steered angle detected by said steered angle detecting means at the control cycles to determine a cumulative value when the degree of the curve is more than a given value and correcting means for correcting the neutral position learning angle by subtracting a given value from the neutral position learning angle when an absolute value of the cumulative value exceeds a given value and when the cumulative value is positive, said correcting means adding the given value to the neutral position learning angle when the absolute value of the cumulative value exceeds the given value and when the cumulative value is negative.

30. A system as set forth in claim 1, wherein said relative position and speed determining means determines whether the objects detected by said beam scanning means are moving objects, stationary objects, or obstacles on a side of the road based on the relative speeds of the objects and the speed of the system vehicle, and wherein said same lane probability determining means monitors a relative position of one of the obstacles to the system vehicle or one of the moving objects or the stationary objects to determine whether a lane exists on either side of the system vehicle or not, a result of the determination being used to modify the same lane probabilities.

31. A system as set forth in claim 1, wherein when a turn indicator of the system vehicle is turn on, said same lane probability determining means shifts the center of the determination of the target preceding vehicle to a direction indicated by the turn indicator according to the speed of the system vehicle.

32. A system as set forth in claim 31, wherein said same lane probability determining means decreases the same lane probability of the target preceding vehicle when the turn indicator is turned on.

33. A system as set forth in claim 1, wherein when a turn indicator of the system vehicle is turned on, said same lane probability determining means shifts the center of the determination of the target preceding vehicle to a direction indicated by the turn indicator according to the speed of the system vehicle by correcting at least one of the degree of the curve determined by said curve determining means and components of the relative positions of the objects in a lateral direction of the system vehicle so as to decrease the same lane probabilities of the objects in the direction indicated by the turn indicator according to the speed of the system vehicle.

34. A system as set forth in claim 1, wherein said same lane probability determining means increases the same lane probabilities of the objects if the relative speeds of the objects represent that the objects are approaching the system vehicle.

35. A system as set forth in claim 1, wherein said relative position and speed determining means further determines widths of the objects, and wherein when the widths of the objects are smaller than a given value, said same lane probability determining means increases the same lane probabilities of the objects.

36. A system as set forth in claim 13, wherein when the relative speeds of the objects in a lateral direction of the system vehicle is increased, said same lane probability determining means decreases a weight added to the instantaneous same lane probabilities in the weighted averaging operation.

37. A system as set forth in claim 1, further comprising a navigation system using a GPS (Global Positioning System), and wherein when said target preceding vehicle selecting means determines that the curve exists in a forward direction based on data provided by the navigation system, the objects located at a given distance away from the system vehicle are not selected as the target preceding vehicle.

38. A system as set forth in claim 23, wherein the initial value of the target intervehicle distance time is determined based on an intervehicle distance to the target preceding object selected by said target preceding vehicle selecting means when said intervehicle distance control means is not in operation.

39. A system as set forth in claim 23, wherein said target intervehicle distance determining means increases the target intervehicle distance to the target preceding vehicle for a given period of time after the target preceding vehicle is selected.

40. A system as set forth in claim 23, wherein when the number of objects detected by said beam scanning means is greater than a given value, said target intervehicle distance determining means decreases the target intervehicle distance to the target preceding vehicle.

41. A system as set forth in claim 23, wherein said speed control means performs cruise control, and wherein when a system operator increases a set speed in the cruise control, the target change rate of speed determining means sets the target change rate of the speed of the system vehicle to a first acceleration value, when the system operator decreases the set speed in the cruise control, the target change rate of speed determining means setting the target change rate of the speed of the system vehicle to a given deceleration value, when the target preceding vehicle is not selected by said target preceding vehicle selecting means and when the system operator does not change the set speed in the cruise control, the target change rate of speed determining means setting the target change rate of the speed of the system vehicle to a second acceleration value smaller than the first acceleration value, within a given period of time after the system driver increases the set speed in the cruise control, the target change rate of speed determining means setting the target change rate of the speed of the system vehicle to the first acceleration value.

42. A system as set forth in claim 41, wherein when the target change rate of the speed of the system vehicle is smaller than the second acceleration value, the target change rate of speed determining means increases the target change rate of the speed to the second acceleration value gradually.

43. A system as set forth in claim 23, wherein when the target preceding vehicle is not selected by said target preceding vehicle selecting means and when a turn indicator of the system vehicle is turned on to indicate a direction from a passing lane to a traveling lane, said target change rate of speed determining means decreases the target change rate of the speed.

44. A system as set forth in claim 23, wherein when the target preceding vehicle is not selected by said target preceding vehicle selecting means and when a turn indicator of the system vehicle is turned on to indicate a direction from a traveling lane to a passing lane, said target change rate of speed determining means increases the target change rate of the speed.

45. A system as set forth in claim 23, wherein said target change rate of speed determining means determines whether the system vehicle is traveling on a downhill road or not, and wherein when the system vehicle is determined as being traveling on the downhill road, said target change rate of speed determining means decreases the target change rate of the speed.

46. A system as set forth in claim 23, wherein said target change rate of speed determining means decreases the target change rate of the speed as the same lane probability of the target preceding vehicle is lowered.

47. A system as set forth in claim 23, wherein said target change rate of speed determining means decreases an absolute value of the target change rate of the speed when the target intervehicle distance determined by said target intervehicle distance determining means is greater than a given distance.

48. A system as set forth in claim 23, wherein said speed control means prohibits the speed of the system vehicle from increasing until the intervehicle distance to the target preceding vehicle exceeds the target intervehicle distance determined by said target intervehicle distance determining means by a given distance.

49. A system as set forth in claim 1, further comprising weather condition detecting means for detecting a given weather condition degrading an operation of said beam scanning means, intervehicle distance control prohibiting means for prohibiting an operation of said intervehicle distance control means when the given weather condition is detected, and alarm means for issuing an alarm when the operation of said intervehicle distance control means is prohibited.

50. A system as set forth in claim 1, further comprising control operation informing means for informing a system operator that said intervehicle distance control means is in operation.

* * * * *